United States Patent
Hellwig et al.

(10) Patent No.: US 8,913,979 B2
(45) Date of Patent: Dec. 16, 2014

(54) METHODS, DEVICES AND COMPUTER PROGRAMS FOR SUPPORTING EMERGENCY COMMUNICATIONS

(75) Inventors: Karl Hellwig, Wonfurt (DE); Timo Helin, Herzogenrath (DE); Christian Van de Pol, Heerlen (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 327 days.

(21) Appl. No.: 13/143,397

(22) PCT Filed: May 25, 2012

(86) PCT No.: PCT/EP2012/059919
§ 371 (c)(1),
(2), (4) Date: Oct. 27, 2011

(87) PCT Pub. No.: WO2012/116762
PCT Pub. Date: Sep. 7, 2012

(65) Prior Publication Data
US 2012/0225632 A1   Sep. 6, 2012

Related U.S. Application Data

(60) Provisional application No. 61/448,878, filed on Mar. 3, 2011.

(51) Int. Cl.
H04M 11/04   (2006.01)
H04W 76/00   (2009.01)
H04W 4/22   (2009.01)

(52) U.S. Cl.
CPC .............. *H04W 76/007* (2013.01); *H04W 4/22* (2013.01)
USPC ...................... 455/404.1; 455/466; 455/456.1; 455/521; 379/45

(58) Field of Classification Search
CPC . H04W 4/22; H04W 76/007; H04W 52/0261; H04W 52/0296; H04W 4/12; H04M 3/02
USPC ........ 455/404.1, 404.2, 412.1, 458, 466, 521, 455/456.1–457, 414.1–414.3
See application file for complete search history.

(56) References Cited

U.S. PATENT DOCUMENTS 6,038,438 A * 3/2000 Beeson et al. ............. 455/404.2
6,233,445 B1 * 5/2001 Boltz et al. ................. 455/404.2
(Continued)

FOREIGN PATENT DOCUMENTS

WO   2007043772 A1   4/2007
WO   2008151406 A1   12/2008
(Continued)

OTHER PUBLICATIONS

Ohta, Masataka, (2006) Overload Protection in a SIP Signaling Network, 0-7695-2649-7/06/$20.00 (c) IEEE.*
(Continued)

*Primary Examiner* — Sharad Rampuria
(74) *Attorney, Agent, or Firm* — Coats & Bennett, PLLC

(57) ABSTRACT

A network node (4), referred to as answering point (4), performs a method including a triggering procedure (s22) for triggering the transmission, towards a mobile station (2), of an instruction message ($12_a$) including an instruction to start a new emergency communication towards the answering point (4). The triggering procedure (s22) includes sending (s226), towards the mobile station (2), a trigger message ($12_b$). The mobile station (2) performs a method including a receiving procedure (s28) and a starting procedure (s30). The receiving procedure (s28) includes receiving the instruction message ($12_a$) including the instruction to start a new emergency communication towards the answering point (4), and the starting procedure (s30) includes starting a new emergency communication towards the answering point (4). This enables to re-establish an emergency communication between the answering point (4) and the mobile station (2). The invention also relates to network nodes, mobile stations and computer programs.

26 Claims, 14 Drawing Sheets eCall – Third Party Services

(56) References Cited

U.S. PATENT DOCUMENTS

| | | | |
|---|---|---|---|
| 8,351,973 B2 * | 1/2013 | Johannesson et al. | 455/521 |
| 8,417,212 B2 * | 4/2013 | Cepuran et al. | 455/404.1 |
| 2012/0225632 A1 * | 9/2012 | Hellwig et al. | 455/404.1 |

FOREIGN PATENT DOCUMENTS

| | | | | |
|---|---|---|---|---|
| WO | WO2008/151406 | * | 12/2008 | H04L 12/66 |
| WO | 2009151395 A1 | | 12/2009 | |

OTHER PUBLICATIONS

GSM Europe, "GSME Position; Options for eCall MSD signalling", pp. 1-22, Apr. 21, 2006, Brussels, Belgium.

CN1, "Reintroduction of deleted arrow diagrams", 3GPP/SMG Meeting #11, pp. 1-44, Feb. 28-Mar. 3, 2000, Umea, Sweden, N1-000516.

3rd Generation Partnership Project. "Technical Specification Group Services and System Aspects; eCall Data Transfer; In-band Modem Solution; Conformance Testing (Release 9)." 3GPP TS 26.269 V9.2.0, Dec. 2010, Sophia Antipolis Valbonne, France.

3rd Generation Partnership Project. "Technical Specification Group Services and System Aspects; eCall Data Transfer; In-band Modem Solution; ANSI-C Reference Code (Release 9)." 3GPP TS 26.268 V9.3.0, Dec. 2010, Sophia Antipolis Valbonne, France.

3rd Generation Partnership Project. "Technical Specification Group Services and System Aspects; eCall Data Transfer; In-band Modem Solution; General Description (Release 9)." 3GPP TS 26.267 V9.2.0, Dec. 2010, Sophia Antipolis Valbonne, France.

Telefon AB LM Ericsson, et al. "S4-100940 eCall—Remarks, Questions and Alternative." Annex 3, 2010 Nov. 11, Barcelona, Spain.

Telefon AB LM Ericsson, et al. "S4-100940 eCall—Remarks, Questions and Alternative." Annex 4, 2010 Nov. 11, Barcelona, Spain.

Ericsson. "eCall Via SMS, a Technical Analysis." Document for Discussion, Oct. 9, 2008, pp. 1-11.

3rd Generation Partnership Project. "eCall: Remarks, Questions and Alternative." 3GPP TSG-SA4 #61, Tdoc S4-100940, Nov. 8-12, 2010, Barcelona, Spain.

3rd Generation Partnership Project. "eCall: Inband? eSMS!" 3GPP/SA4, Attachment to Tdoc S4-100940, Nov. 11, 2010, Barcelona, Spain.

NIS GLONASS (National Navigation Services Provider). "ERA GLONASS Project: Road Accident Emergency Response System." Jan. 25, 2011.

* cited by examiner

METHODS, DEVICES AND COMPUTER PROGRAMS FOR SUPPORTING EMERGENCY COMMUNICATIONS

TECHNICAL FIELD

The present invention relates to methods, devices and computer programs for supporting emergency communications. This notably includes supporting the establishment of an emergency communication from a mobile station, for instance located or integrated in a vehicle, to a public safety answering point (PSAP) or third party service center (TPSC).

BACKGROUND

The establishment of an emergency communication constitutes an important step in efficiently providing emergency services, including police, fire and rescue services and emergency medical services. For instance, establishing an emergency communication may be of paramount importance to providing emergency medical care after a car accident. In order to reduce the time required for rescue squads to reach the accident site, it has been envisaged to provide a system where an emergency communication would be automatically established by a vehicle when an accident occurs. For instance, an emergency communication may be automatically established when airbag sensors are triggered. In an exemplary situation, a mobile phone in the form of an in-vehicle system (IVS) may automatically establish an emergency communication and may transfer information about the accident, such as the position of the vehicle, time stamps, and vehicle type, to a PSAP or TPSC.

In the context of creating 3GPP standards, it has been proposed to use a specific in-band modem for emergency communications to transmit a minimum set of data (MSD) from an IVS to a PSAP. However, it has been observed that setting up an emergency communication, including sending the MSD, using in-band signalling through the voice channel is inflexible. Furthermore, the deployment of such a mechanism would be expensive. Indeed, the deployment would imply modifying the existing mobile and wire line networks to allow the in-band modems to operate appropriately.

It has therefore been proposed to use an enhanced short message service (SMS) to transmit the MSD from an IVS to a PSAP. More background information on the enhanced SMS solution and its advantages may be found in Tdoc S4-100940, "eCall: Remarks, Questions and Alternative", 3GPP TSG-SA4 #61, 8-12 Nov. 2010, Barcelona, Source: Telefon AB LM Ericsson, ST-Ericsson SA. Further background may be found in international application WO 2009/151395 A1.

It is desirable to provide methods, apparatuses and computer programs to improve the technical infrastructure for supporting emergency communications and thus assisting rescue squads in quickly, efficiently and appropriately reacting to emergency situations. It is further desirable to fulfil this aim while taking into account the need for reliability and computational efficiency, as well as the aim to reduce the network infrastructure costs and the operational and maintenance costs.

SUMMARY

To meet or at least partially meet the above-mentioned goals, methods, mobile stations, network nodes, and computer programs are defined in the independent claims. Advantageous embodiments are defined in the dependent claims.

In one embodiment, a method is carried out by a mobile station for participating in re-establishing an emergency communication between a network node, here referred to as answering point, and the mobile station. The method includes a receiving procedure and a starting procedure. The receiving procedure includes receiving a message, here referred to as instruction message, wherein the instruction message includes an instruction to start a new emergency communication towards the answering point. The starting procedure includes starting a new emergency communication towards the answering point.

In the context of supporting emergency communications, the method addresses the need that sometimes arises, after an emergency communication has been established and subsequently terminated, to call back the mobile station that initiated the original emergency communication. That is, the method addresses the need to re-establish an emergency communication between the mobile station and an answering point, such as for instance a PSAP or TPSC. Situations indeed occur where an answering point needs to contact the person who originally made an emergency call in order to obtain more information. This may for instance be the case because an emergency call has been unexpectedly terminated by the person who made the call.

In the method, an instruction message is sent to a mobile station and received by the mobile station. The instruction message includes an instruction to the mobile station to start a new emergency communication towards the answering point. In other words, the structure and content of the instruction message is so that the mobile station understands the message as an instruction to start a new emergency communication towards the answering point. Furthermore, since the instruction message includes an instruction to start a new emergency communication, the instruction message is recognizable not only by the mobile station itself but also by intermediate network nodes between the answering point and the mobile station. The intermediate network nodes and the mobile station may therefore handle the instruction message in a manner commensurate with its importance. For instance, the instruction message may be handled with higher priority and/or with more perseverance than usual messages.

The mobile station, upon receiving the instruction message, executes the starting procedure including starting a new emergency communication towards the answering point, possibly after checking the legitimacy of the received instruction message. Since the new emergency communication originates from the mobile station, i.e. the emergency communication is restarted from the mobile station, the new emergency communication will be handled, like the original emergency communication, with a priority higher than usual communications. This increases the chances of successfully establishing the new emergency communication.

The initial emergency communication may have been an emergency voice call, an emergency message, or combination of both. The restart instruction, i.e. the instruction message, is a request for the mobile station to restart an emergency call, to resend an emergency message, or to do both operations.

In one embodiment, the initial emergency communication is an emergency call and is still ongoing, i.e. not yet terminated when the instruction message is received by the mobile station. The instruction message requests the mobile station to send an emergency message. The invention therefore covers reestablishing an emergency communication by causing the mobile station to send an emergency message communication while an initial emergency voice call is still ongoing.

In one embodiment, the instruction message requests the mobile station to repeat sending emergency messages, for instance periodically or when information changes. This embodiment is especially advantageous if the MSD information in the emergency message contains location information from a GPS included, i.e. built-in, or attached to the mobile station. In one embodiment, a further instruction message requests the mobile station to stop repeatedly sending emergency messages.

The instruction message may, in some embodiments, be a short message service (SMS) message, an Unstructured Supplementary Service Data (USSD) message, a Session Initiation Protocol (SIP) message, an IP Multimedia Subsystem (IMS) message, or another suitable message.

In particular, in one embodiment, the instruction message is not sent using in-band signalling through a voice channel. In most cases, there is no active voice channel when the instruction message is sent. Not sending the instruction message using in-band signalling through a voice channel is advantageous in that sending data by such means would require specific modifications of the technical infrastructure supporting the voice channel. Therefore, messaging protocols, such as SMS, USSD, SIP, Instant Messaging (IM), Multimedia Messaging (MMS), and the like, are advantageous for conveniently and efficiently sending messages without having to make complex assumptions on the possible distortion of the voice channel, etc. Furthermore, the instruction message is sent without the need for the answering point to first establish from its side a voice channel with the mobile station. Since the answering point sends a non-voice path message to the mobile station and the mobile station restarts the emergency communication from its side, the restarted communication receives higher priority treatment. Yet furthermore, intermediate nodes within the communication network may be more easily configured to recognize such instruction messages and their meaning, so that the messages may be more easily handled with higher priority. For instance, an instruction message may include a particular information element (IE), value in a field or parameter to identify that the message relates to an emergency situation. This particular IE or field value may indicate that the instruction message includes an instruction to start a new emergency communication and may then be recognized by elements, such as for instance every element, in the communication chain between the answering point and the mobile station. The elements may then be configured to recognize the message as being highly important and handle it accordingly.

In one embodiment, the instruction message additionally includes a more specific or further IE, field value or parameter specifying the type of new emergency communication to be (re)started, i.e. emergency call, emergency message, combination of call and message, repeating emergency message (to instruct the mobile station to periodically send an emergency message or to do so upon detecting a change of information), stop repeating emergency message, or the like.

In one embodiment, the starting procedure is a procedure for autonomously starting a new emergency communication towards the answering point. This configuration of the mobile station to autonomously start a new emergency communication upon receiving the instruction message is advantageous in order to re-establish an emergency communication without requiring the person who initially made the emergency call to take any action. There may indeed be situations where a person is no longer physically able to take a call, possibly due to the emergency situation itself, whereas the person may still be able to talk and therefore provide vital information for assisting the rescue efforts. In other words, autonomously starting the new emergency communication by the mobile station may help rescue squads, via the answering point, to obtain information that could not be obtained during the initial emergency communication. This may notably be advantageous to obtain up-to-date information about the position of a person who initially made an emergency call, as the position may have changed in the meantime, for instance because the person is moving to escape a wildfire. An autonomous start is also advantageous in the case that a person is totally disabled or not in the position to take a call.

Autonomously and repeatedly sending emergency messages is also very advantageous if the mobile station is equipped with or attached to a GPS receiver. In the wildfire example, a continuous update of the position is available without action of the user.

Autonomously starting a new emergency communication may also be advantageous to appropriately react to a car jacking. A driver may for example first uses a hidden button connected to the IVS to issue an emergency message towards the PSAP. Later, the PSAP operator may, in one embodiment of the invention, instruct the IVS to autonomously establish an emergency voice call so that the operator can listen to any in-vehicle conversation without this being noticed by the car jacker (whether the driver is still in the car or has been, in the meantime, forced out of the car).

In one embodiment, the starting procedure includes sending, towards the answering point, a message, here referred to as response message. The response message may be, in some embodiments, a SMS message, an e-SMS message (i.e. a SMS that will be recognized by the network as requiring high priority handling), an USSD message, a SIP message, an IMS message, or another suitable message. This enables the mobile station to send MSD, such as up-to-date MSD, to the answering point. The response message may be recognized by intermediate transmission elements within the network as being an important message, so that the response message may be handled with higher priority than usual messages. The instruction message and the response message may even be exchanged during an ongoing emergency voice call. This exchange simultaneously to an ongoing emergency voice call is particularly advantageous.

As mentioned above, the answering point may, in some embodiments, be a public safety answering point (PSAP) or a third-party service centre (TPSC). A PSAP is a publicly operated answering point, whereas a TPSC may be operated by a private company, such as a car manufacturer.

In one embodiment, the mobile station is an in-vehicle system. The mobile station may, in this embodiment, include a radio interface integrated within the vehicle. The radio interface may be interconnected with a control bus of the vehicle notably to enable the mobile station to decide when to initiate an emergency communication as well as to send diagnosis information relevant for assisting rescue efforts.

In one embodiment, a method is carried out by an answering point, for participating in re-establishing an emergency communication between the answering point and a mobile station. The method includes a triggering procedure. The triggering procedure includes triggering the transmission, towards the mobile station, of a message, here referred to as instruction message, wherein the instruction message includes an instruction (to the mobile station) to start a new emergency communication towards the answering point. The triggering procedure includes sending, towards the mobile station, a message, here referred to as trigger message.

It has been explained above that the invention relates, in some embodiments, to a mobile station configured to receive and understand an instruction message including an instruction to start a new emergency communication towards an answering point. The answering point is configured to participate in efficiently re-establishing an emergency communication with the mobile station, by taking actions to cause the instruction message to be sent to the mobile station. The triggering procedure includes sending a trigger message, which may be the instruction message or not, in order to trigger the transmission of the instruction message towards the mobile station. As mentioned above, since the instruction message includes a particular instruction to start a new emergency communication, the network elements between the answering point and the mobile station may be configured to recognize the instruction message as an important message and may handle it accordingly, i.e. with higher priority and/or with more perseverance than usual messages. This may also apply to the trigger message, which may be handled with higher priority and/or with more perseverance by intermediate elements within the network.

The trigger message, like the instruction message, may, in some embodiments, be a SMS message, an USSD message, a SIP message, an IMS message, or another suitable message.

In one embodiment, the trigger message is the instruction message including the instruction to start the new emergency communication towards the answering point. In this embodiment, the trigger message sent by the answering point is the same as the instruction message received by the mobile station. The invention is, however, not limited to this configuration. In other embodiments, the trigger message sent by the answering point is received by an intermediate network node, such as a mobile switching centre (MSC), a VMSC, a SMS switching center, or the like, and the intermediate network node, upon receiving the trigger message, generates (such as by converting the trigger message into an instruction message) and sends an instruction message to the mobile station.

In one embodiment, the method carried out by the answering point is further carried out by an intermediate network node, such as a MSC or the like. This method further includes a receiving procedure and a sending procedure both carried out by the intermediate network node. The receiving procedure includes receiving, by the intermediate network node, the trigger message sent from the answering point. The sending procedure then includes sending, by the intermediate network node towards the mobile station, the instruction message including the instruction to start the new emergency communication towards the answering point. In other words, the trigger message originating from the answering point is received by the intermediate network node and, then, the intermediate network node either forwards it to the mobile station—in this first case, the instruction message is the same as the trigger message—or converts it into an instruction message—in this second case, the instruction message is different from the trigger message (because, in the second case, the trigger message is processed by the intermediate network node to generate another message, namely the instruction message).

Apart from sending the instruction message, the intermediate network node provides the additional advantage that it can verify the authenticity and validity of the trigger message so that the mobile station does not have to go through an internal routine for verifying the instruction message. The same advantage is applicable if the trigger message is just forwarded (in the case where the instruction message is the same as the trigger message), in that the intermediate network node may check the validity before forwarding the message to the mobile station.

In one embodiment, a mobile station is configured for participating in re-establishing an emergency communication between an answering point and the mobile station. The mobile station includes a receiver, here referred to as instruction message receiver, and a further unit, here referred to as new emergency communication starter. The instruction message receiver is configured for receiving, and appropriately processing, the instruction message including an instruction to start a new emergency communication towards the answering point. The new emergency communication starter is configured for starting a new emergency communication towards the answering point, after receiving the instruction message.

In one embodiment, an answering point is configured for participating in re-establishing an emergency communication between the answering point and a mobile station. The answering point includes a unit, here referred to as instruction message transmission trigger unit. The instruction message transmission trigger unit is configured for triggering the transmission, towards the mobile station, of an instruction message including an instruction to start a new emergency communication towards the answering point. In particular, the instruction message transmission trigger unit is configured for sending, towards the mobile station, a message, here referred to as trigger message, intended to cause the instruction message to be transmitted to the mobile station.

In other words, the answering point, by sending a trigger message, triggers the transmission of an instruction message to the mobile station. As mentioned above, in a first case, the instruction message is the same as the trigger message. In a second case, the instruction message is different from the trigger message. In the second case, the trigger message is processed by the intermediate network node to generate another message, namely the instruction message. The intermediate network node then sends it to the mobile station.

In one embodiment, a system includes an answering point as described above and an intermediate network node, for participating together in re-establishing an emergency communication between the answering point and a mobile station. The intermediate network node includes a receiver, here referred to as trigger message receiver, and a sender, here referred to as instruction message sender. The trigger message receiver is configured for receiving the trigger message from the answering point; and the instruction message sender is configured for sending, towards the mobile station, the instruction message including the instruction to start the new emergency communication towards the answering point.

The invention also relates to computer programs including computer-readable instructions configured, when executed on a mobile station or an answering point, to cause the mobile station or the answering point respectively to carry out the methods as described above.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
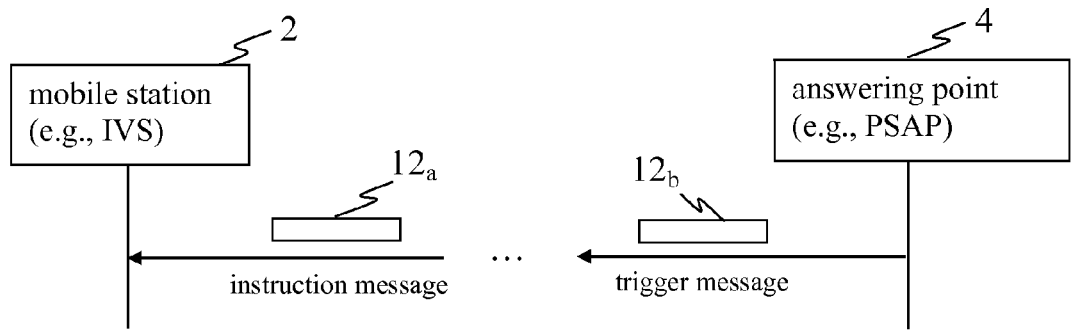
FIG. 1 schematically illustrates the transfer of a trigger message from an answering point and the subsequent reception of an instruction message by a mobile station, in one embodiment of the invention.

FIG. 1 schematically illustrates a method in one embodiment of the invention involving an answering point 4 and a mobile station 2. Mobile station 2 may be, but is not limited to, an in-vehicle system (IVS). Answering point 4 is a network node that may be, but is not limited to, a public safety answering point (PSAP) or a third-party service center (TSPC). Mobile station 2, or mobile terminal, includes a radio interface. In that sense, mobile station 2 has the capability to be mobile although it may also be temporarily stationary, i.e. in a fixed position.

After an emergency communication has been established between mobile station 2 and answering point 4, the emergency communication may then have been terminated (not illustrated). The termination of the emergency communication may be unexpected from the perspective of the operator on the answering point side. In this sense, or for other reasons, the operator at the answering point side may wish to re-establish, i.e. to restart, an emergency communication towards mobile station 2. A normal call initiated by answering point 4 towards mobile station 2 would be handled with low priority and may therefore not succeed.

In order to avoid this low priority problem, the embodiment illustrated in FIG. 1 includes sending, from answering point 4, a trigger message $12_b$ towards the mobile station 2. Trigger message $12_b$ may optionally transit through a SMS service center (not illustrated). Trigger message $12_b$ triggers the process of sending an instruction message $12_a$ towards mobile station 2. Instruction message $12_a$ includes an instruction to mobile station 2 to start a new emergency communication towards answering point 4. Since instruction message $12_a$ includes an instruction specific to the important purpose to be attained, instruction message $12_a$ can be handled within the network (the network is illustrated by the three dots " . . . " in FIG. 1) with higher priority and/or with more perseverance than usual messages.

Once mobile station 2 receives instruction message $12_a$ pursuant to a receiving procedure, mobile station 2 carries out a starting procedure including starting a new emergency communication towards answering point 4. This new emergency communication towards answering point 4 will be handled with high priority within the network, since the new emergency communication is technically similar to an original emergency communication initiated by mobile station 2. At that stage, it can therefore be said that a new emergency communication has been established from mobile station 2 but at the request of answering point 4.

Trigger message $12_b$ may be an SMS message, a USSD message, a SIP message, an IMS message, or the like. Trigger message $12_b$ relates to the important task of triggering the reestablishment of a new emergency communication from mobile station 2 to answering point 4. This may be recognized by at least some of the intermediate nodes of the network, so that high priority may be assigned to the handling of trigger message $12_b$. The same applies to instruction message $12_a$.

Figure 2:
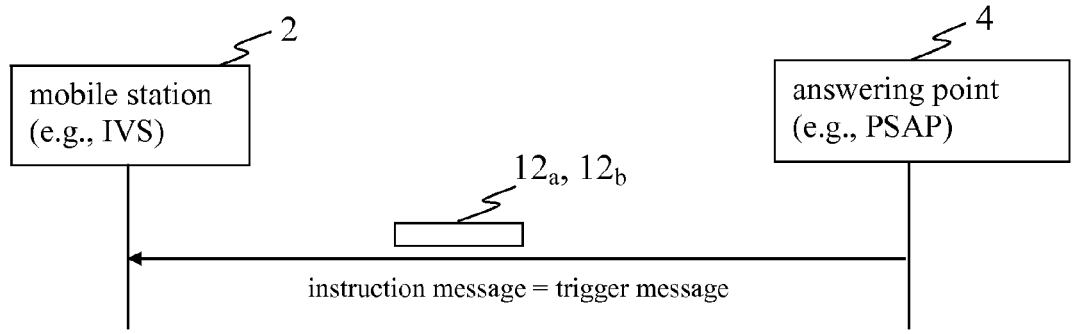
FIG. 2 schematically illustrates an embodiment similar to the one illustrated in FIG. 1, but where the trigger message is the instruction message itself.

FIG. 2 schematically illustrates a method in one embodiment of the invention, which differs from the method illustrated in FIG. 1 in that, in FIG. 2, trigger message $12_b$ is the same as instruction message $12_a$. If trigger/instruction message $12_a$, $12_b$ is relayed by an intermediate node (not illustrated), this may be performed without substantial modification to the content of trigger/instruction message $12_a$, $12_b$.

Figure 3:
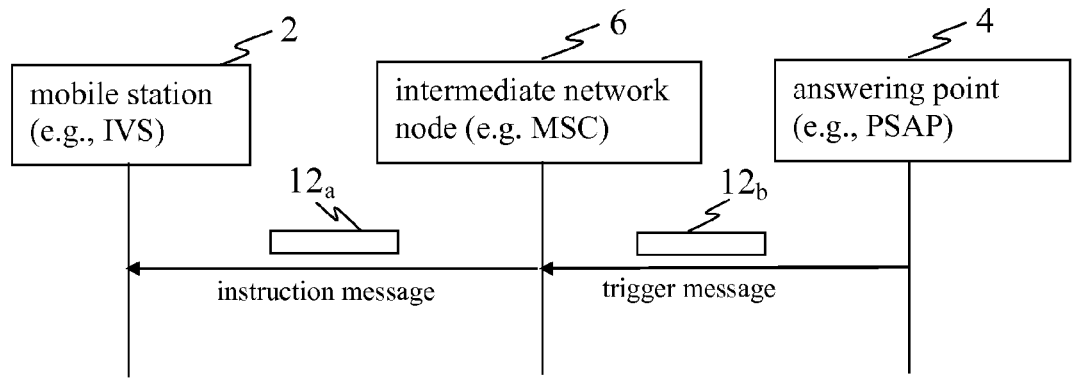
FIG. 3 schematically illustrates an embodiment similar to the one illustrated in FIG. 1, but where the trigger message is received by an intermediate network node (such as a MSC) and the intermediate network node sends, in reaction, an instruction message to the mobile station.

FIG. 3 schematically illustrates a method in one embodiment of the invention, which differs from the method illustrated in FIGS. 1 and 2 in that, in FIG. 3, trigger message $12_b$ is sent from answering point 4 to intermediate network node 6, such as MSC 6, and, subsequently (and in reaction to receiving trigger message $12_b$), MSC 6 sends instruction message $12_a$ to mobile station 2. Instruction message $12_a$ is sent through the radio access network (RAN). Trigger message $12_b$ and instruction message $12_a$ may be of the same type or not. For instance, trigger message $12_b$ may be an SIP message whereas instruction message $12_a$ may be an SMS message.

Figure 4:
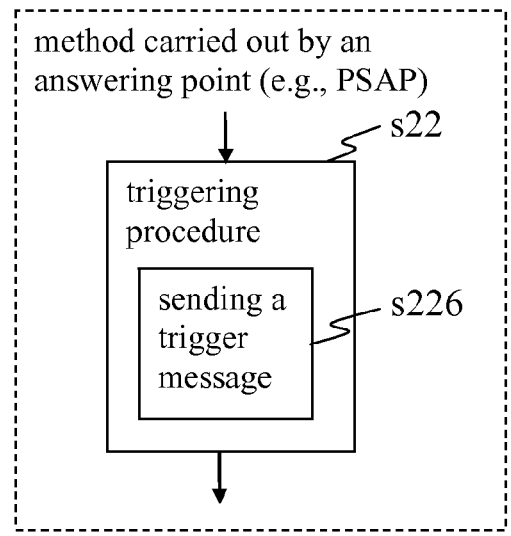
FIG. 4 is a flowchart of a method carried out by an answering point, in one embodiment of the invention.

FIG. 4 is a flowchart of a method carried out by an answering point 4, such as for instance a PSAP, in one embodiment of the invention. The method is used for participating in re-establishing an emergency communication between answering point 4 and a mobile station 2.

As illustrated, the method includes a triggering procedure s22 for triggering the transmission, towards a mobile station 2, of an instruction message $12_a$, wherein the instruction message $12_a$ includes an instruction to start a new emergency communication towards answering point 4. The instruction message $12_a$ is constructed so as to be understood by the mobile station 2. Triggering procedure s22 includes a step of sending s226, towards the mobile station 2, a trigger message $12_b$. The trigger message $12_b$ is constructed so as to be understood by at least one intermediate node within the network in such a manner that the intermediate node may then send an instruction message $12_a$ towards mobile station 2.

Figure 5A:
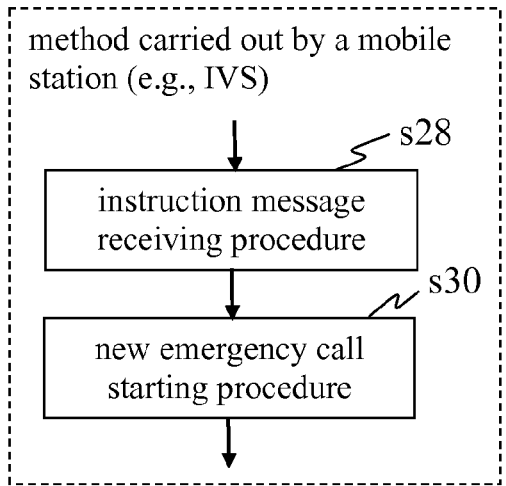
FIG. 5a is a flowchart of a method carried out by a mobile station, in one embodiment of the invention.

FIG. 5a is a flowchart of a method carried out by a mobile station 2 in one embodiment of the invention. The mobile station 2 may be an IVS. The method may be performed after the method illustrated in FIG. 4. The method carried out by the mobile station 2, as illustrated in FIG. 5a, includes an instruction message receiving procedure s28 and a new emergency communication starting procedure s30. Instruction message receiving procedure s28 includes receiving, by mobile station 2, the instruction message $12_a$. Instruction message $12_a$ includes, as mentioned above, an instruction (to mobile station 2) to start a new emergency communication towards the answering point 4.

After determining, by mobile station 2, that instruction message $12_a$ includes an instruction to start a new emergency communication, new emergency communication starting procedure s30 is executed. New emergency communication starting procedure s30 includes starting a new emergency communication towards answering point 4. Starting a new emergency communication towards answering point 4 may be subject to a prior determination, by mobile station 2, as to whether received instruction message $12_a$ is legitimate, for instance by determining whether mobile station 2 has recently established and terminated an emergency communication towards answering point 4.

Figure 5B:
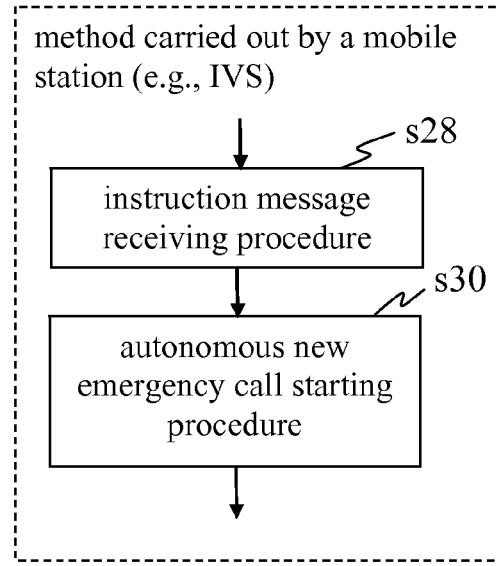
FIG. 5b is a flowchart of a method carried out by a mobile station in one embodiment of the invention, wherein a new emergency communication starting procedure is autonomously performed by a mobile station.

New emergency communication starting procedure s30 may be performed autonomously by mobile station 2, as illustrated in FIG. 5b. This means that new emergency communication starting procedure s30 is carried out without interaction with other devices or with humans. Alternatively, in a non-autonomous new emergency communication starting procedure s30, prior to starting a new emergency communication towards answering point 4, mobile station 2 may prompt the mobile station's user (not illustrated) to accept, or to reject, starting the new emergency communication.

In one embodiment, new emergency communication starting procedure s30 is performed automatically by mobile station 2. This means that new emergency communication starting procedure s30 may include interaction with other entities, such as for instance a GPS receiver, but the procedure is carried out without intervention of a human.

Figure 6A:
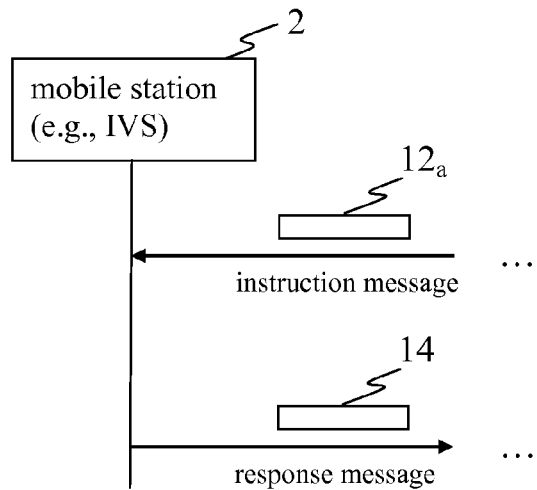
FIG. 6a schematically illustrates the process during which a mobile station receives an instruction message and issues, in reaction, a response message, in one embodiment of the invention.

FIG. 6a schematically illustrates a method carried out by a mobile station 2 in one embodiment of the invention. Namely, new emergency communication starting procedure s30 may include sending s302 a response message 14 towards answering point 4. Response message 14 may be a modified SMS message sent over the network to participate in establishing the emergency communication. Response message 14 may include a MSD associated with emergency communications.

Figure 6B:
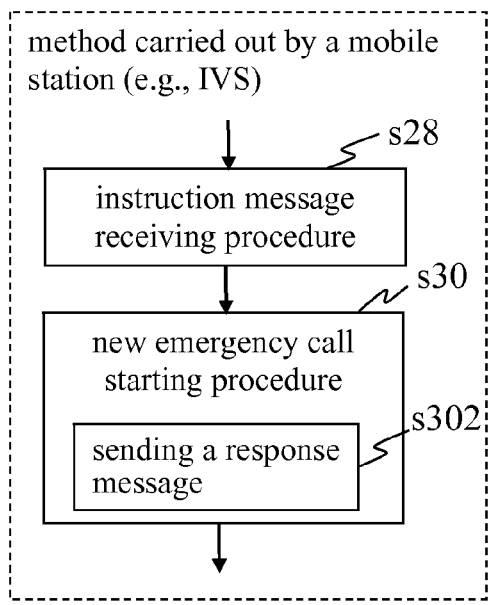
FIGS. 6b and 6c are flowcharts of methods carried out by a mobile station in embodiments of the invention, which differ respectively from FIGS. 5a and 5b in that the new emergency communication starting procedure includes sending a response message.
Figure 6C:
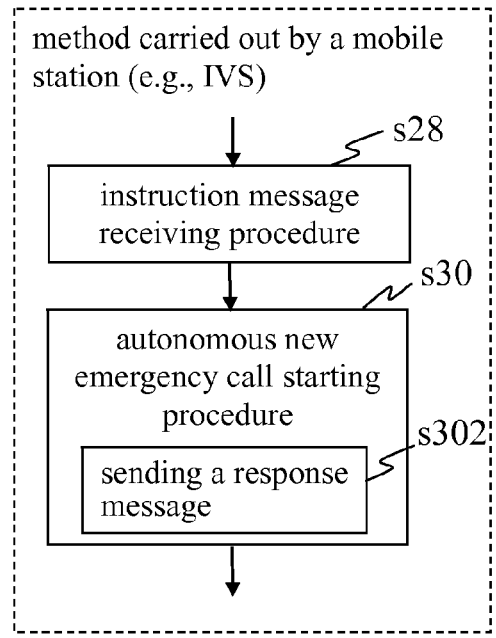

FIGS. 6b and 6c are flowcharts of methods carried out by a mobile station 2 in embodiments of the invention. Compared to FIGS. 5a and 5b, the flowcharts of FIGS. 6b and 6c illustrate that response message 14 is sent s302 as part of new emergency communication starting procedure s30, whether new emergency communication starting procedure s30 is autonomous (as illustrated in FIG. 6c) or not.

Figures 7, 8:
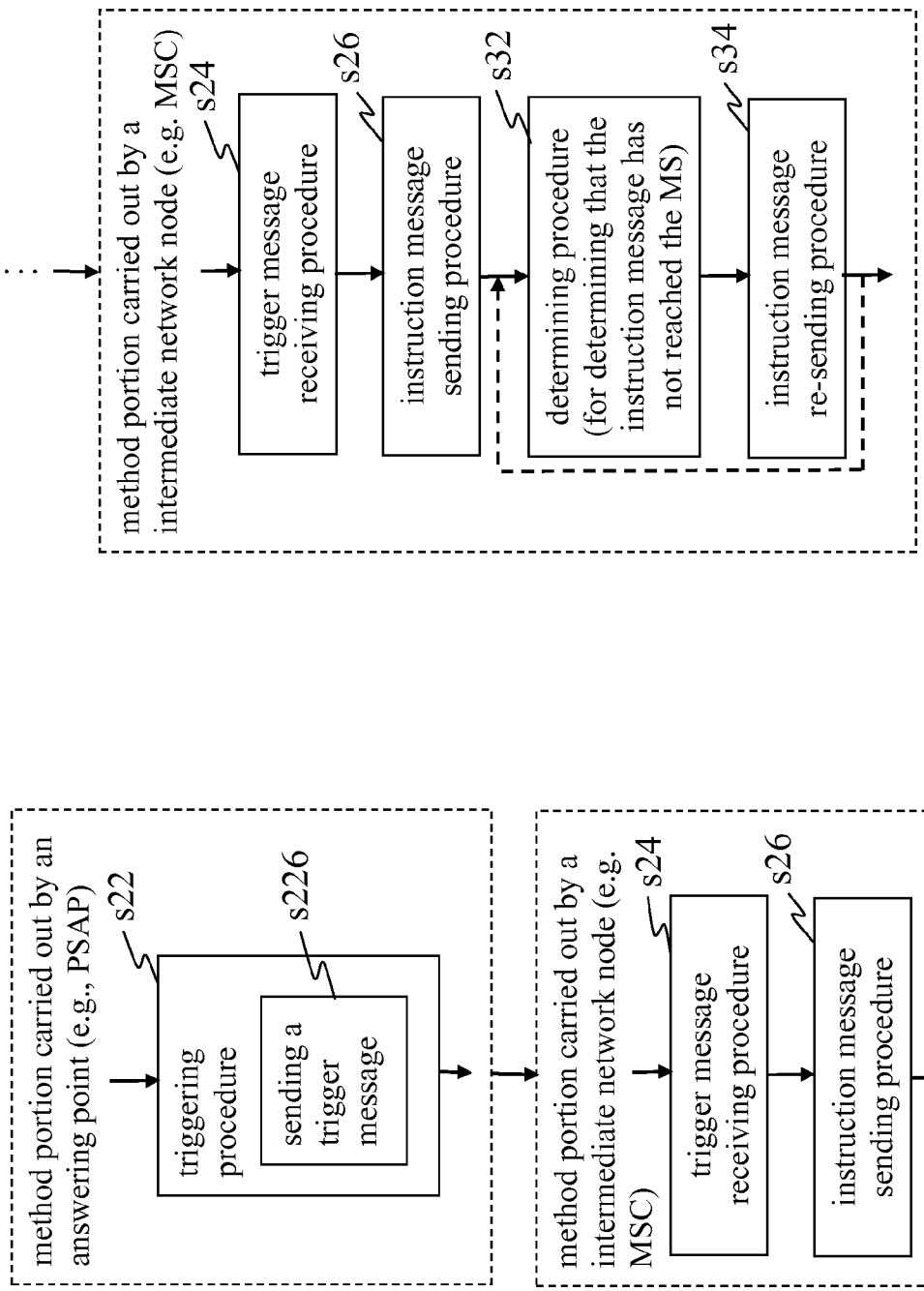
FIG. 7 is a flowchart of a method carried out by an answering point and subsequently by an intermediate network node, in one embodiment of the invention.
FIG. 8 is a flowchart of a portion of a method carried out by an answering point and an intermediate network node, in one embodiment of the invention, including a step of resending, by the intermediate network node, the instruction message, if necessary.

FIG. 7 is a flowchart illustrating a method carried out by an answering point 4 and an intermediate network node 6, such as an MSC 6 or the like, in one embodiment of the invention. The method includes a first method portion carried out by answering point 4, as already described with reference to FIG. 4. The method further includes a second method portion carried out by MSC 6. The second method portion includes a trigger message receiving procedure s24 and an instruction message sending procedure s26. Trigger message receiving procedure s24 includes receiving, by MSC 6, a trigger message $12_b$ sent from answering point 4. Then, instruction message sending procedure s26, also carried out by MSC 6, includes sending, towards mobile station 4, instruction message $12_a$ including the instruction to start the new emergency communication towards answering point 4. Among all the messages received and handled by MSC 6, MSC 6 may handle trigger message $12_b$ and carries out the process of sending instruction message $12_a$ with higher priority and/or with more perseverance. MSC 6 may indeed be configured to identify these messages as being highly important because they relate to an emergency situation.

Although not illustrated in FIG. 7, intermediate network node 6 may additionally perform an optional message conversion procedure. The message conversion procedure includes converting trigger message $12_b$ into instruction message $12_a$ in the embodiment where instruction message $12_a$ is not the same as trigger message $12_b$. No message conversion is needed in the embodiment where instruction message $12_a$ is the same as trigger message $12_b$.

Although neither illustrated in FIG. 7, intermediate network node 6 may additionally perform an optional validity checking procedure. The validity checking procedure includes checking the validity of trigger message $12_b$. In one embodiment, the validity checking procedure is part of trigger message receiving procedure s24.

FIG. 8 is a flowchart of a method portion carried out by a MSC 6, which may be performed after the method portion carried out by answering point 4 as illustrated in FIG. 4 and in the top part of FIG. 7. The three dots "..." on the top of FIG. 8 illustrate the method portion carried out by answering point 4. The method portion carried out by MSC 6, as illustrated in FIG. 8, includes, in addition to trigger message receiving procedure s24 and instruction message sending procedure s26 (already described with reference to FIG. 7), a determining procedure s32 for determining, by MSC 6, whether instruction message $12_a$ has not successfully reached mobile station 2. If the outcome of determining procedure s32 is that instruction message $12_a$ has not successfully reached mobile station 2, instruction message $12_a$ is resent, pursuant to instruction message resending procedure s34, to mobile station 2. Determining procedure s32 and instruction message resending procedure s34 may be repeated a number of times, as illustrated by the dashed arrow on FIG. 8. In particular, in one embodiment, determining procedure s32 and instruction message resending procedure s34 are repeated a number of times that is larger than the number of times that MSC 6 attempts to resend messages that do not relate to an emergency communication. In other words, the process of sending, and resending if necessary, instruction messages $12_a$ has higher priority compared to usual messages. Or yet in other words, MSC 6 attempts to send instruction messages $12_a$ with more perseverance than it does when usual messages are concerned.

In particular, in one embodiment, determining procedure s32 and instruction message resending procedure s34 are repeated, as long as instruction message $12_a$ has not reached mobile station 2, up to n times, wherein n is an integer and at least one of the following applies: n 2, n 5, n 20, and n 50.

Figure 9:
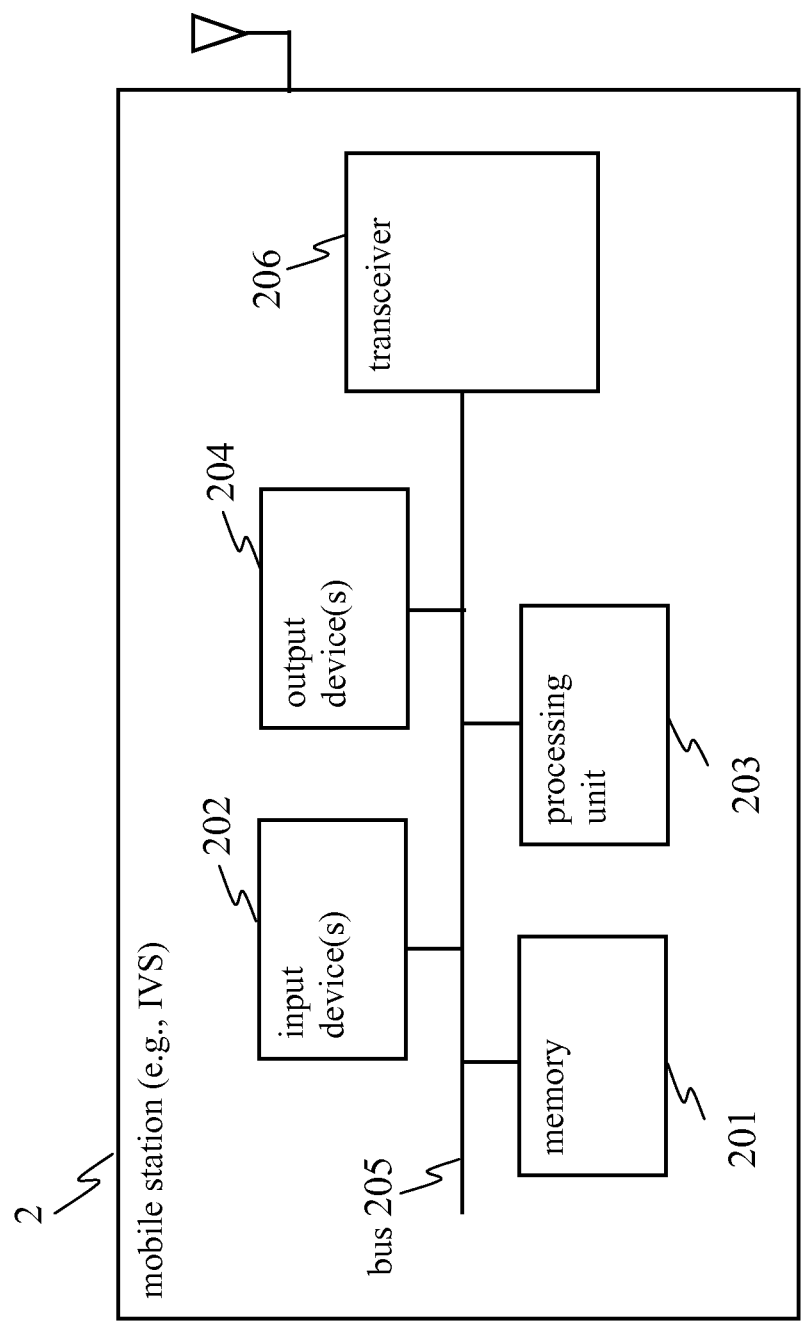
FIG. 9 schematically illustrates some constituent elements of a mobile station that may be used in embodiments of the invention.

FIG. 9 schematically illustrates one exemplary implementation of a mobile station 2. Mobile station 2 may include a transceiver 206, a processing unit 203, a memory 201, an input device(s) 202, an output device(s) 204, and a bus 205.

Transceiver 206 may include transceiver circuitry for transmitting and/or receiving symbol sequences using radio frequency signals via one or more antennas. One antenna is schematically illustrated in FIG. 9. Processing unit 203 may include a processor, a micro-processor, or processing logic that may interpret and execute instructions. Processing unit 203 may perform a data processing function for inputting, outputting, and processing data including data buffering and device control functions, such as call processing control, user interface control, or the like.

Memory 201 may provide permanent, semi-permanent, or temporary storage of data and instructions for use by processing unit 203 in performing device processing functions. Memory 201 may include read-only memory (ROM), random access memory (RAM), large capacity storage device, such as magnetic and/or optical recording medium and its corresponding drive, and/or other types of memory devices.

Input device(s) 202 may include mechanisms for entry of data into mobile station 2. For example, input device(s) 202 may include a keypad (not shown), microphone (not shown) or a display unit (not shown). The keypad may permit manual user entry of data into mobile station 2. The microphone may include mechanisms for converting audio input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light emitting diode (LED) display, a cathode ray tube (CRT) display, an organic light emitting diode (OLED) display, etc.

Output device(s) 204 may include mechanisms for outputting data in audio, video and/or hard copy format. For example, output device(s) 204 may include a speaker (not shown) that includes mechanisms for converting electrical signals into audio output. Output device(s) 204 may further include a display unit that displays output data to the user. For example, the display unit may provide a graphical user interface that displays output data to the user. Bus 205 may interconnect the various components of mobile station 2 to permit the components to communicate with one another.

The configuration of the components of mobile station 2 illustrated in FIG. 9 is for illustrative purposes only. Other configurations with more components, fewer components or a different arrangement of components may be implemented. For example, mobile station 2 may include a location determining device (not shown), such as, for example, a GPS device that may be used to determine a location of mobile station 2 or to determine the location of a vehicle associated with mobile station 2. This information may be sent as part of the MSD.

Figure 10:
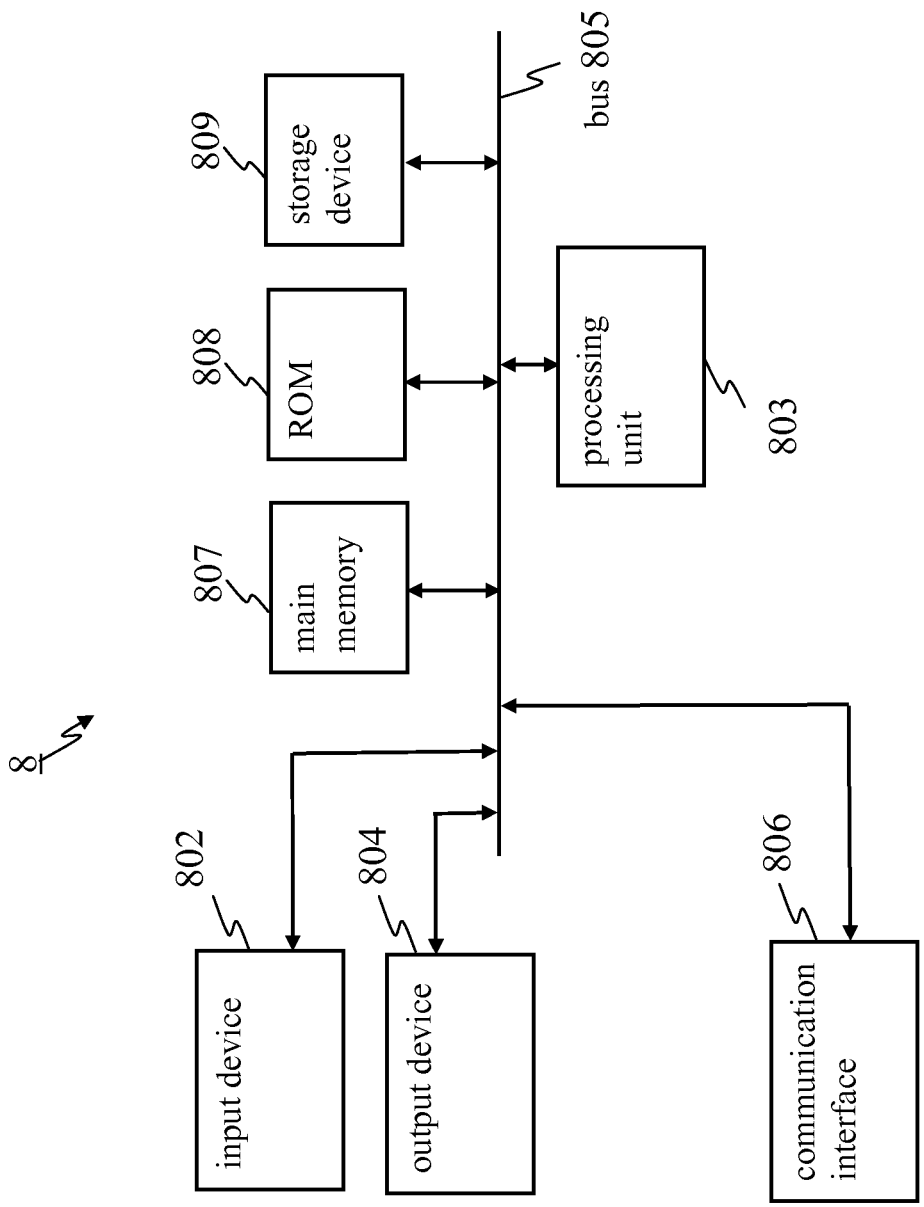
FIG. 10 schematically illustrates some constituent elements of a network node, such as an answering point or an intermediate network node, which may be used in embodiments of the invention.

FIG. 10 is a schematic diagram of an exemplary implementation of a network device 8, which may correspond to answering point 4 (such e.g. a PSAP or TPSC), MSC 6, SMS-SC 5, TPS-SC 4a and/or PSAP-SC 4b. As illustrated, network device 8 may include a bus 805, a processing unit 803, a main memory 807, a ROM 808, a storage device 809, an input device 802, an output device 804, and a communication interface 806. Bus 805 may include a path that permits communication among the components of network device 8.

Processing unit 803 may include a processor, a microprocessor, or processing logic that may interpret and execute instructions. Main memory 807 may include a RAM or another type of dynamic storage device that may store information and instructions for execution by processing unit 803. ROM 808 may include a ROM device or another type of static storage device that may store static information and instructions for use by processing unit 803. Storage device 809 may include a magnetic and/or optical recording medium and its corresponding drive.

Input device 802 may include a mechanism that permits an operator to input information to network device 8, such as a keyboard, a mouse, a pen, voice recognition and/or biometric mechanisms, etc. Output device 804 may include a mechanism that outputs information to the operator, including a display, a printer, a speaker, etc. Communication interface 806 may include any transceiver-like mechanism that enables network device 8 to communicate with other devices and/or systems. For example, communication interface 806 may include mechanisms for communicating with another device or system via a network.

Network device 8 may perform certain operations or processes described herein. Network device 8 may perform these operations in response to processing unit 803 executing software instructions contained in a computer-readable medium, such as main memory 807, ROM 808, and/or storage device 809. A computer-readable medium may be defined as a physical or a logical memory device. For example, a logical memory device may include memory space within a single physical memory device or distributed across multiple physical memory devices. Each of main memory 807, ROM 808 and storage device 809 may include computer-readable media. The magnetic and/or optical recording media (e.g., readable CDs or DVDs) of storage device 809 may also include computer-readable media. The software instructions may be read into main memory 807 from another computer-readable medium, such as storage device 809, or from another device via communication interface 806.

The software instructions contained in main memory 809 may cause processing unit 803 to perform operations or processes described herein. Alternatively, hardwired circuitry may be used in place of or in combination with software instructions to implement processes and/or operations described herein. Thus, implementations described herein are not limited to any specific combination of hardware and software.

Figure 11:
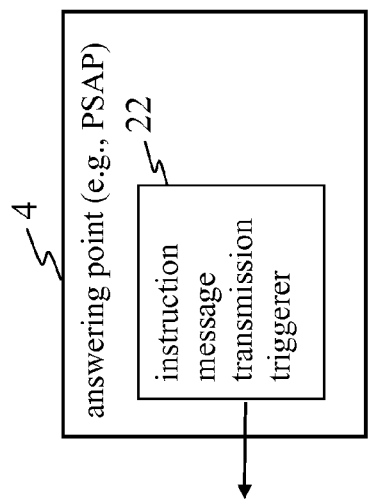
FIG. 11 schematically illustrates an answering point in one embodiment of the invention.

FIG. 11 schematically illustrates an answering point 4, which may be for instance a PSAP or TPSC, in one embodiment of the invention. Answering point 4 includes an instruction message transmission triggerer 22. Instruction message transmission triggerer 22 may for instance be implemented as computer-readable instructions capable of being stored on main memory 807 and executed on processing unit 803 as illustrated in FIG. 10.

Instruction message transmission triggerer 22 is configured, for instance when activated by an initial operator instruction, for triggering the transmission, towards mobile station 2, of instruction message $12_a$ including, as mentioned above, an instruction to start a new emergency communication towards answering point 4. Instruction message transmission triggerer 22 is configured for sending, towards mobile station 2, a trigger message $12_b$ (as symbolically illustrated by the arrow originating from instruction message transmission triggerer 22 in FIG. 11). Therefore, answering point 4 is configured for participating in re-establishing an emergency communication between answering point 4 and mobile station 2 by sending a message towards mobile station 2 so that mobile station 2 is instructed to re-establish an emergency communication.

Figure 12:
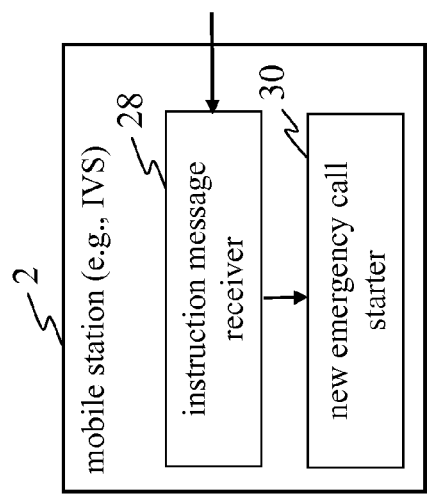
FIG. 12 schematically illustrates a mobile station in one embodiment of the invention.

FIG. 12 schematically illustrates a mobile station 2, which may be for instance an IVS, in one embodiment of the invention. Mobile station 2 is configured for participating in re-establishing an emergency communication between an answering point 4, such as the one illustrated in FIG. 11, and mobile station 2.

In particular, mobile station 2 includes an instruction message receiver 28 and a new emergency communication starter 30. Instruction message receiver 28 is configured for receiving instruction message $12_a$ (as symbolically illustrated by the arrow arriving at instruction message receiver 28). Instruction message $12_a$ includes, as mentioned above, an instruction to start a new emergency communication towards the answering point 4. Mobile station 2 is configured for, upon receiving instruction message $12_a$, processing the instruction (for instance by appropriate parsing) and, accordingly, operating new emergency communication starter 30, which is configured for starting a new emergency communication towards answering point 4.

Figure 13:
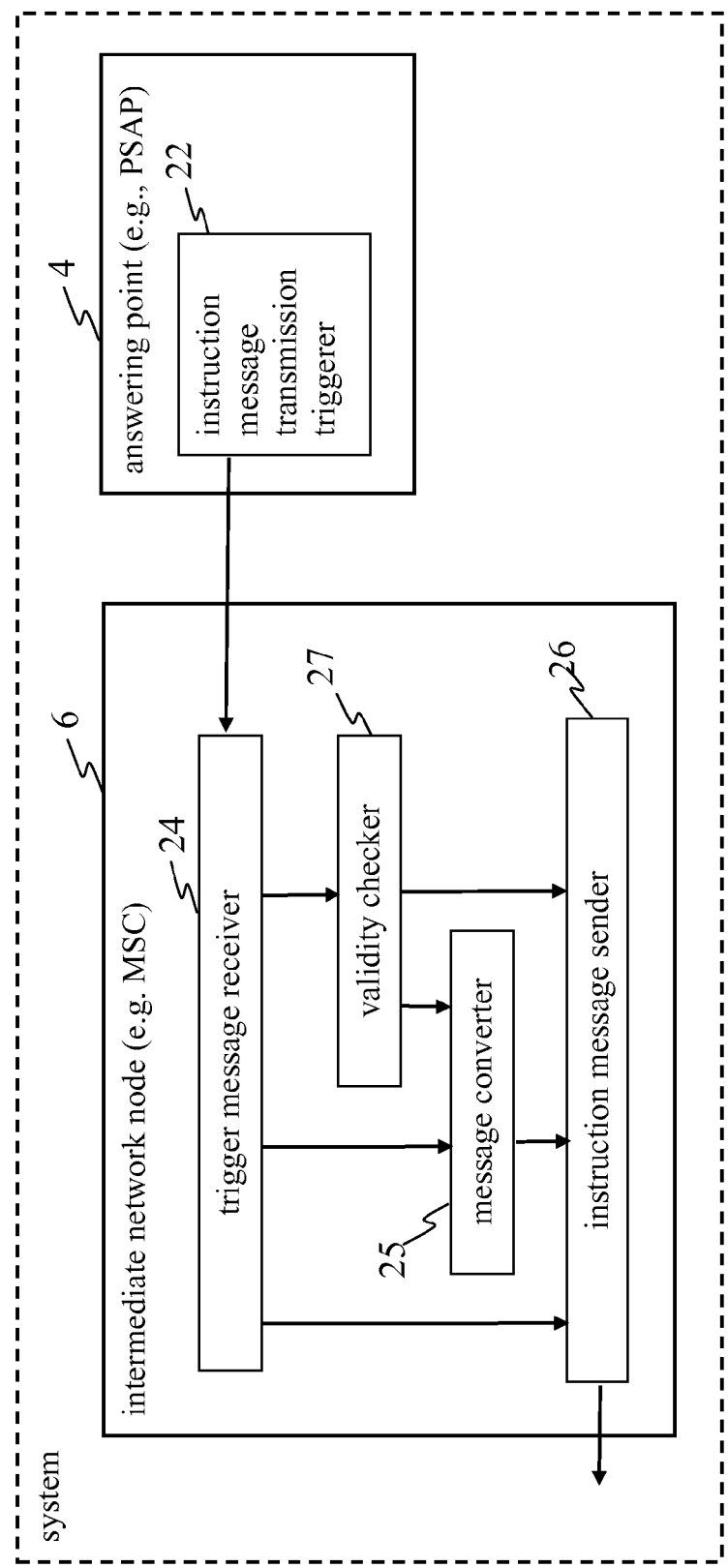
FIG. 13 schematically illustrates a system including an answering point and an intermediate network node in one embodiment of the invention.

FIG. 13 schematically illustrates a system in one embodiment of the invention. The system includes an answering point 4 as illustrated and described with reference to FIG. 11 and an intermediate network node 6, such as a MSC 6, including a trigger message receiver 24 and an instruction message sender 26. Trigger message receiver 24 is configured for receiving the trigger message $12_b$ from the answering point 4 (as symbolically illustrated by the arrow from instruction message transmission triggerer 22 to trigger message receiver 24 in FIG. 13). Intermediate network node 6 also includes instruction message sender 26 that is configured for, when intermediate network node 6 receives trigger message $12_b$, sending, towards mobile station 4, an instruction message $12_a$ (as symbolically illustrated by the arrow originating from instruction message sender 26). Instruction message $12_a$ includes, as mentioned above, an instruction for mobile station 2 to start a new emergency communication towards answering point 4.

In particular, in one embodiment, intermediate network node 6 may be configured to handle trigger message $12_b$ and the process of sending instruction message $12_a$ with higher priority and/or more perseverance than usual messages not related to emergency communications.

As also schematically illustrated in FIG. 13, intermediate network node 6 may include an optional message converter 25. Message converter 25 is configured for converting trigger message $12_b$ into instruction message $12_a$ in the embodiment where instruction message $12_a$ is not the same as trigger message $12_b$. No message converter 25 is needed in the embodiment where instruction message $12_a$ is the same as trigger message $12_b$.

As also schematically illustrated in FIG. 13, intermediate network node 6 may optionally include a validity checker 27. Validity checker 27 is configured for checking the validity of trigger message $12_b$. In one embodiment, validity checker 27 is part of trigger message receiver 24.

Figure 14:
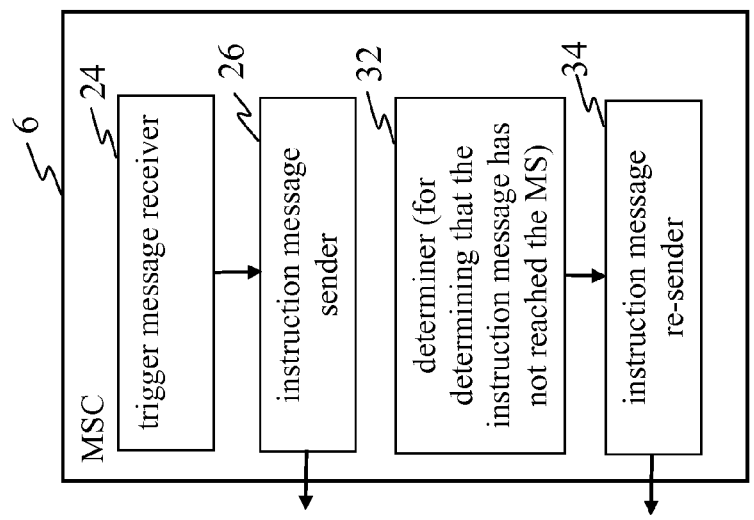
FIG. 14 schematically illustrates an intermediate network node in one embodiment of the invention, including an instruction message re-sender for resending the instruction message if necessary.

FIG. 14 schematically illustrates an intermediate network node 6, such as a MSC 6, in a system in one embodiment of the invention. Intermediate network node 6 includes trigger message receiver 24 and instruction message sender 26 as illustrated and described with reference to in FIG. 13 (the optional message converter 25 and validity checker 27 are not illustrated in FIG. 14, but may be included also in the system). In addition, intermediate network node 6 includes a determiner 32 and an instruction message re-sender 34. Determiner 32 is configured for determining whether instruction message $12_a$ has not successfully reached mobile station 2. When it is determined that instruction message $12_a$ has not successfully reached mobile station 2 (i.e. the message has been lost), intermediate network node 6 is configured for attempting up to a number of times to resend instruction message $12_a$ towards mobile station 2. This is the function of instruction message re-sender 34, which is configured for resending instruction message $12_a$ towards mobile station 2 (as symbolically illustrated by the arrow originating from instruction message re-sender 34 in FIG. 14).

Figure 15:
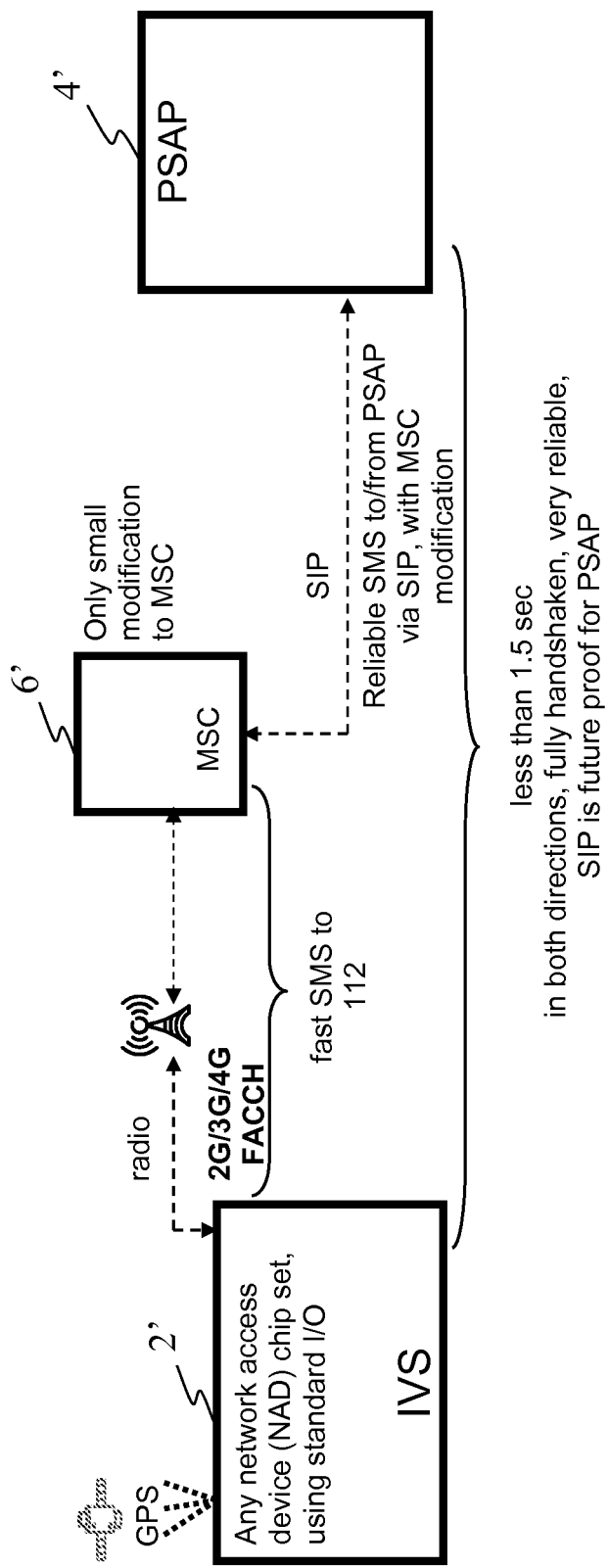
FIG. 15 is a diagram schematically illustrating, for the purpose of understanding the background of the invention, an exemplary implementation of an emergency communication established using modified SMS sent towards a PSAP.

FIG. 15 is a diagram schematically illustrating, for the purpose of further understanding the background of the invention, an exemplary implementation of an emergency communication establishment using modified SMS.

Before turning to FIG. 15 itself, it may be useful to mention relevant existing public emergency call service proposals. The European Commission (EC) aims at setting up a common pan-European emergency call system, referred to as "eCall". The eCall system is based on the existing emergency call system (based on the numbers 112 and E112 in Europe, but may also apply to 911 in the U.S., etc), complemented with new features:

(i) the eCall can be generated automatically at a car crash (e.g. by airbag sensors trigger) or manually by pressing an emergency button;

(ii) the in-vehicle-system (IVS) establishes an emergency voice call to short number "112" (or "911" in the U.S., etc.), providing additional routing information through the so-called "Service Category" information element (SC-IE). This SC-IE is a three-octet parameter (see 3GPP TS 24.008, 10.5.4.33) and contains two eCall-specific flags (bit 6 and bit 7 of 1 . . . 8; 8=MSB) that allow differentiated routing by the mobile network according to:

| Bit7-Bit6: | |
|---|---|
| 00b | normal emergency call |
| 01b | manually triggered eCall |
| 10b | automatically triggered eCall |
| 11b | Undefined |

(iii) the IVS sends additional data to the PSAP containing information about the accident, such as position, time stamp, vehicle type, etc. This data is referred to as minimum set of data (MSD), with "minimum" indicating that additional data may be added.

(iv) existing 3GPP standards define a specific in-band modem for eCall to transmit this MSD from the IVS to the PSAP. This in-band modem is designed to transfer exactly 140 octets from IVS to PSAP, but only a few commands from PSAP to IVS. No data can be sent from PSAP to IVS.

This in-band modem has been criticized as inflexible, not future proof and as expensive for deployment due to the risk that the existing mobile and wire line networks may need to be modified to allow these in-band modem to operate all over Europe and elsewhere.

An alternative method has been developed to transmit the MSD (and all future eCall data) from IVS to PSAP by means of a modified SMS protocol, termed "eSMS". This eSMS proposal is described in above-referred document Tdoc S4-100940.

FIG. 15 is a diagram schematically illustrating an exemplary implementation of the above-mentioned eSMS solution.

The IVS 2' is shown on the left-hand side. It includes the necessary logic and sensors for the emergency call (eCall) triggering and the positioning (e.g. via GPS). It includes also a GSM radio modem chip set, supporting at least voice calls and SMS. This chip set is slightly modified to include the service category IE and it contains in addition, specifically for eSMS, small modifications for a fast transmission of the SMS during the time when a voice call exists.

The serving MSC 6' shown in the middle includes routing tables for the emergency voice call (not shown). In addition, MSC 6' is configured to evaluate the service category IE for routing of the emergency voice call.

Furthermore, MSC 6' is modified allowing a fast transfer of the SMS in GSM and for filtering the eSMSes out of the millions of normal SMS. PSAP 4' on the right-hand side includes equipment for handling the emergency voice call (not shown).

In addition, PSAP 4' has an Internet protocol (IP) interface, which is usually necessary for many reasons, i.e. inter-PSAP communication, communication between PSAP 4' and the various rescue squads (police, fire brigade, ambulance, helicopter service and more). An eCall-equipped PSAP 4' preferably has an IP interface.

For eSMS, a "Virtual Private Network Tunnel" (VPN-Tunnel) is established on a permanent basis. MSC 6' and PSAP 4' exchange emergency call (eCall) related data through this VPN tunnel.

IVS 2' uses available AT commands (i.e. Hayes command set) to trigger the emergency voice call and to send and receive the SMS to and from the GSM chip set within the car. Existing signalling channels of the mobile network (dashed lines) are used for emergency call (eCall) data transfer. eSMS is a normal SMS with SMS-Service-Center=112 (or another agreed number, such as "911" in the U.S., etc.). eSMS is running fast over the existing GSM signalling channel (the transmission time is generally smaller than 1.5 seconds from IVS 2' to PSAP 4') by using the existing FACCH (Fast Associated Control Channel). The FACCH uses "frame stealing", i.e. it replaces when needed a speech frame by an FACCH frame. This speech frame stealing process is relatively rarely performed and is therefore in practice not audible. Through this frame stealing process, the eSMS gets automatically the same high priority in the radio network as the emergency voice call.

MSC 6' filters the eSMS (in view of the fact that SMS-SC=112, or another agreed number, as mentioned above) out of the masses of normal SMS and sends the emergency call (eCall) data directly and fast via secured IP to PSAP 4'.

MSC 6' routes the voice path to the next local PSAP 4'. In the same manner, MSC 6' also routes the emergency call (eCall) data to the same local PSAP 4' or a central emergency call (eCall) data server. The choice of architecture is left to the PSAP organizations(s).

The correlation between voice call and emergency call (eCall) data is based on the phone number of IVS 2'. Serving MSC 6' adds the IVS number in both cases: to the voice call (as originating number sent to the PSAP 4') and in the SMS (as originating number sent to the PSAP 4' in the SIP messages). Thus, the IVS number can not be different between voice and SMS (over SIP).

Figure 16:
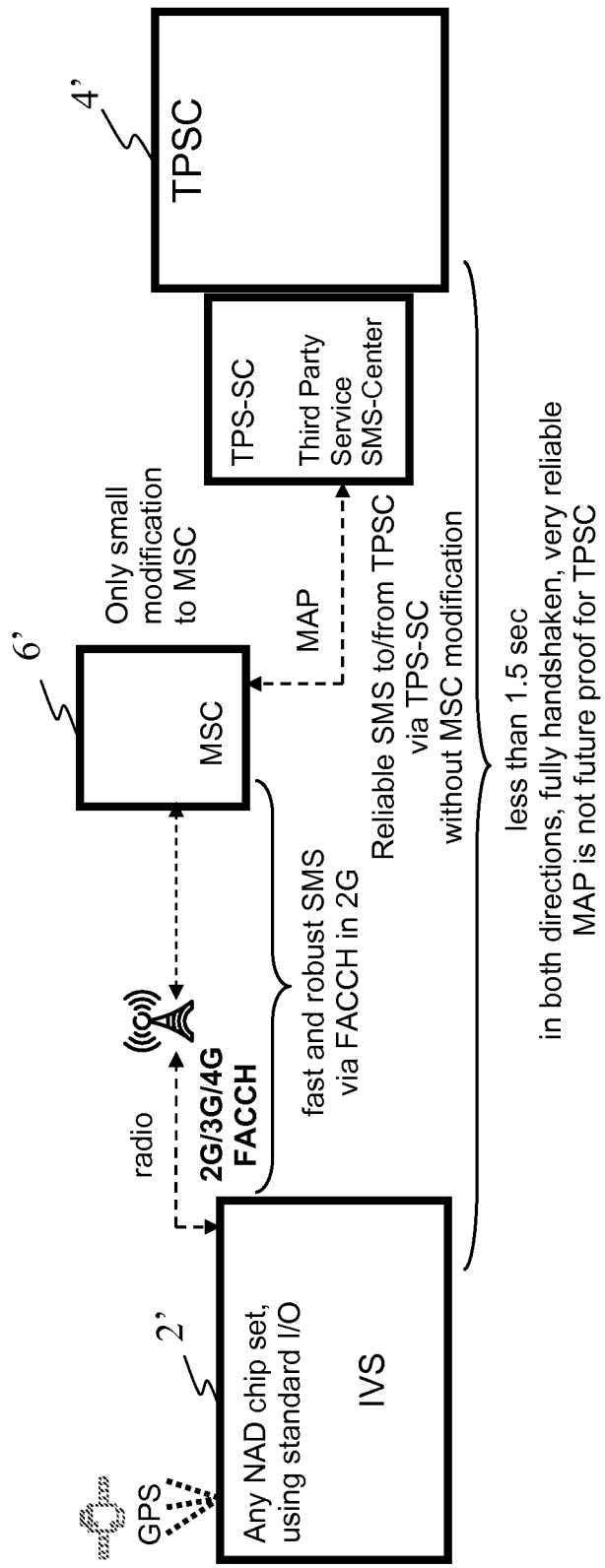
FIG. 16 is a diagram schematically illustrating, also for the purpose of understanding the background of the invention, a further exemplary implementation of an emergency communication established using modified SMS sent towards a TPSC.

Let us now turn to FIG. 16, a diagram schematically illustrating, for the purpose of further understanding the background of the invention, a further exemplary implementation of an emergency communication establishment, using this time a modified SMS sent towards a TPSC 4', i.e. to establish a so-called private emergency call (eCall) service.

For several years, the car industry (many players in different versions) has been offering proprietary emergency services. These proprietary emergency services are also termed "Third Party Services" (TPS) in contrast to the public pan-European emergency call (eCall) service. Basically, all these TPS use SMS to transmit additional, emergency communication related data to their third party services centers (TPSC). These TPS calls from IVS to TPSC 4' are setup as normal (non-prioritized) voice calls to these TPSCs. This is maybe the weak spot in TPS.

Basically, all these TPS use SMS to transmit additional, emergency communication related data to their TPSC 4'. In order to circumvent the usual SMS service centers, which are often losing SMS during overload time, these TPSCs 4' deploy proprietary SMS service centers (TPS-SC) that are tailor made for this purpose: they "never" lose SMS and they deliver the SMS immediately to the human operator of the TPSC 4'. In the opposite direction, from TPSC 4' to IVS 2', these TPS-SCs may attempt to transmit an SMS with more repetitions than usual, if necessary. In this manner, these TPS-SCs maximize the success rate of SMS transmission between IVS 2' and TSPC 4'.

These TPS use the normal SMS transport in RAN and core network. Just the SMS service center is different, connected with a proprietary interface directly to TPSC 4'. The TPS could take advantage of the SMS transport over FACCH, as illustrated in the block diagram of FIG. 16, illustrating the TPS for emergency calls.

The transmission of SMS between IVS 2' and TPS-SC is nearly as reliable as the proposed eSMS scheme via SIP, but it still suffers from the slow transmission over the GSM radio interface, as long as the FACCH is not used. Especially when a voice call is ongoing in parallel, then this SMS transmission may be too slow. The scheme suffers further from the fact that the GSM radio interface handles these SMS as usual, i.e. without specific priority.

The eSMS solution, discussed in relation to FIG. 15, remains the best known alternative in terms of speed, robustness and reliability, but the SMS transmission via the TPS-SC may serve as an acceptable alternative in many networks or for a transition period. Its main advantage is that the MSCs 6' do not need any upgrade.

Here, robustness refers the property of surviving marginal radio channels with no errors. Reliability may be obtained by transmitting messages repeatedly, if necessary, and by well protecting the messages: If a message arrives, then it is correct. A normal SMS is neither robust nor reliable, but just "best effort".

In the context of emergency communications, the specific handling of emergency communications in mobile radio networks is an important issue. When the MSC gets the service request for an "Emergency Call Setup" from a mobile station (here the IVS), then the MSC orders a specific Radio Access setup from the radio access network (RAN), asking for high priority. The RAN then determines whether sufficient resources are available to setup the emergency voice call. If not, the RAN terminates another, normal voice call to make room for the emergency call. This prioritization maximizes the success rate of emergency calls.

Emergency calls such as those illustrated in FIGS. 15 and 16 have however problems. It has been recognized by the inventors, that, in the opposite direction, i.e. if the PSAP 4' or TPSC 4' wants to call-back the IVS 2', for example to obtain additional or updated information from IVS 2' after the first emergency call was terminated, PSAP 4' or TPSC 4' does not have the means for establishing a prioritized emergency call. The signalling elements for such a prioritized call-back do not exist and it would cost considerable effort to standardize and deploy such signalling elements.

The success rate for a call-back from PSAP 4' to IVS 2' is therefore lower than for emergency calls from IVS 2' to PSAP 4'.

This lower success rate is in normal circumstances not noticed, because the networks are rarely overloaded. But in cases of bigger local or regional catastrophes, the effect may become cumbersome. Embodiments of the invention disclose means to overcome this bottleneck to a large extent, and may be described further as follows.

After mobile station 2, such as an IVS, has setup an emergency call, answering point 4, such a PSAP, generally knows the MSISDN of mobile station 2 (i.e. its telephone number). Thus, answering point 4 has the possibility to call back mobile station 2 at any time after the emergency call has been terminated. For the pan-European eCall service, a SIM card is mandatory, so that the MSISDN of the mobile station 2 may be obtained, and mobile station 2 remains registered in the network at least for 12 hours for a potential call-back, after the original (recent) emergency call has been terminated or, likewise, after an emergency message, such as an eSMS, has been transmitted, provided that the sender's MSISDN was included in the emergency message.

It is then also feasible for answering point 4 to send an SMS to mobile station 2. In one embodiment of the invention, answering point 4 (such as PSAP or TPSC) sends an instruction message $12_a$, such as an SMS, to mobile station 2 (using the below described case 1, 2 or 3 or a combination of those) where instruction message $12_a$ has a specific structure and content, containing basically the command "Restart a new eCall", or in short "eRestart". This SMS (i.e., a form of instruction message $12_a$) is sometimes called here "eRestart-SMS". This eRestart-SMS may have additional parameters.

Mobile station 2, upon receiving instruction message $12_a$, i.e. for instance the eRestart command, and provided that mobile station 2 is configured to understand instruction message $12_a$, may autonomously trigger a new emergency call (eCall). This emergency call (eCall) gets again high priority so that the low priority problem of the call-back is overcome.

Let us now describe four cases to illustrate embodiments of the invention, with references to FIGS. 17 to 20.

Figure 17:
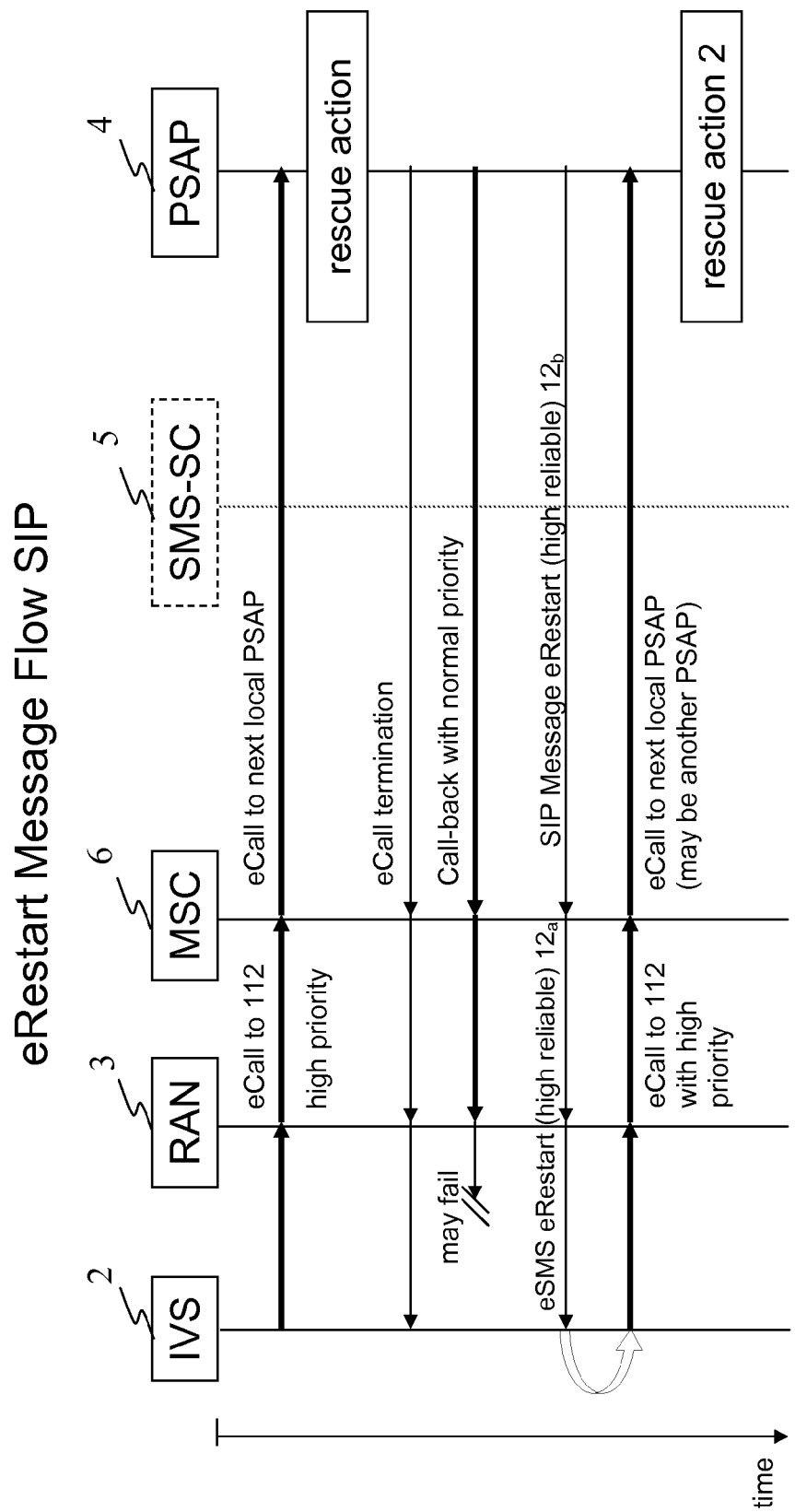
FIG. 17 is a diagram schematically illustrating a method in one embodiment of the invention, wherein SIP messages are exchanged between a PSAP and a MSC for participating in re-establishing an emergency communication with a mobile station.

Case 1: Trigger Message $12_b$ as Sip Message and Instruction Message $12_a$ as SMS FIG. 17 is a diagram schematically illustrating a method in one embodiment of the invention, for participating in re-establishing an emergency communication with a mobile station 2. In this embodiment, a SIP message $12_b$ is sent from PSAP 4 to MSC 6 ("SIP Message eRestart (high reliable) $12_b$"). SIP message $12_b$ constitutes a highly reliable form of trigger message $12_b$. PSAP 4 constitutes, as already mentioned, one form of answering point 4. When PSAP 4 sends SIP message $12_b$ to MSC 6, PSAP 4 bypasses any SMS service center (SMS-SC) 5. Then, MSC 6 sends an SMS $12_a$ to IVS 2 through RAN 3 ("eSMS eRestart (high reliable) $12_a$"). SMS $12_a$ constitutes one form of instruction message $12_a$. IVS 2 constitutes, as already mentioned, one form of mobile phone 2.

This embodiment is feasible as long as IVS 2 is registered to the same MSC 6 as in the previous emergency communication. The process of sending SMS $12_a$ to mobile station 2 is made in a very reliable manner. MSC 6 may handle it with high priority and with more repetitions as usual, if necessary.

The process of sending SMS $12_a$ to mobile station 2 in the absence of an ongoing voice call in parallel (as is the case here to handle the call-back problem) cannot make use of the fast transmission channel via FACCH as the SMS in general does. The reliability of using SMS is still high however, since MSC 6 may handle it in a specific manner, i.e. with higher priority and/or more perseverance then usual SMS.

Figure 18:
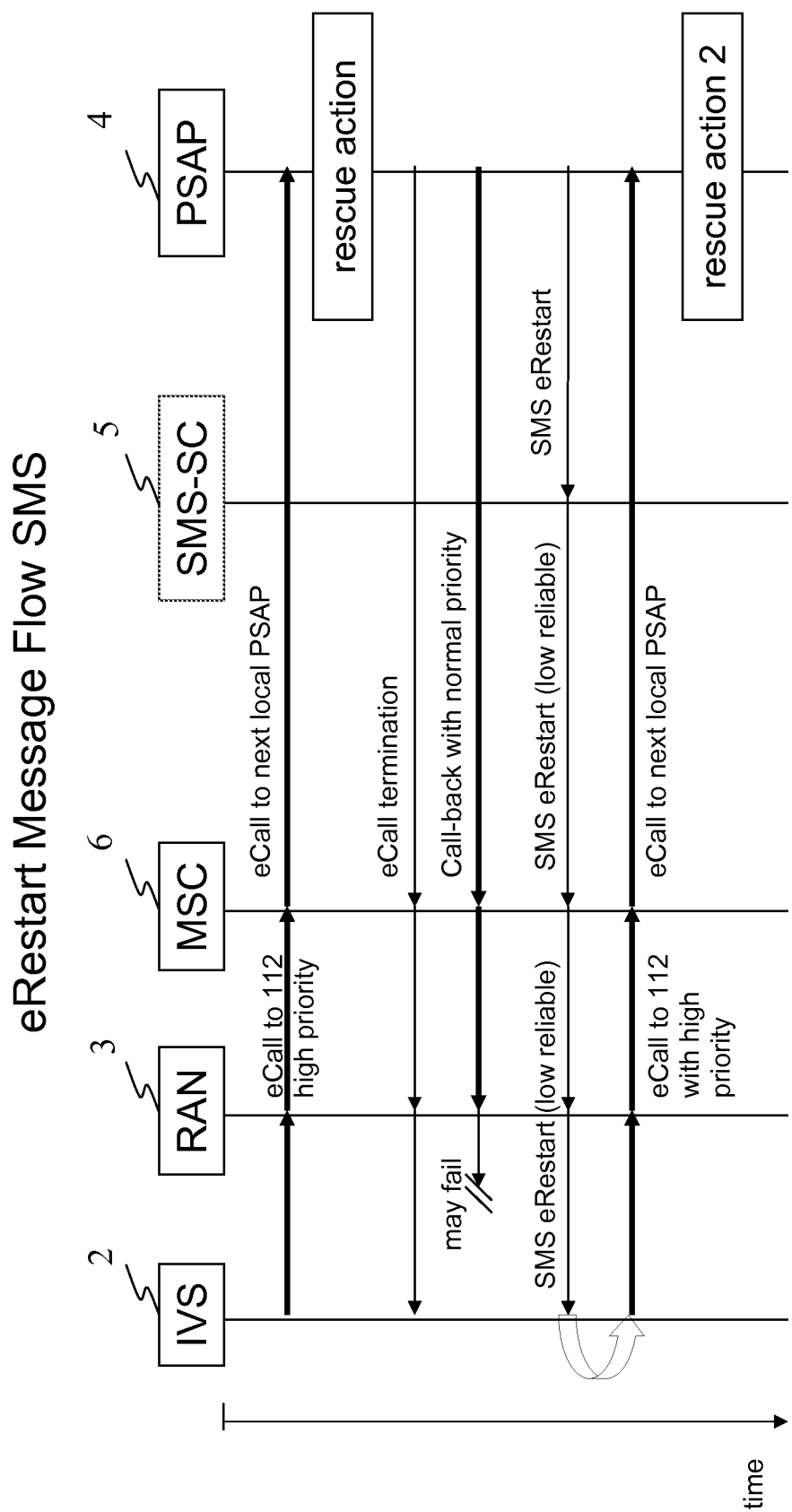
FIG. 18 is a diagram schematically illustrating a method in one embodiment of the invention, wherein SMS messages are exchanged between a PSAP and a MSC for participating in re-establishing an emergency communication with a mobile station.

Case 2: Trigger Message $12_b$ and Instruction Message $12_a$ Both as a Normal SMS FIG. 18 is a diagram schematically illustrating a method in one embodiment of the invention, also for participating in re-establishing an emergency communication with a mobile station 2. In this embodiment, SMS messages $12_b$ are sent from PSAP 4 to MSC 6. Then, SMS $12_a$ are also used between MSC 6 and IVS 2.

In other words, PSAP 6, being an answering point 4, sends an SMS $12_b$, i.e. a trigger message $12_b$ (being the same as the instruction message $12_a$ in this case) via the "usual" way to IVS 2, using a conventional SMS-SC 5. This SMS transmission is less reliable, but often reaches mobile station 2, even if meanwhile mobile station 2 is registered to another MSC. This may be for instance because mobile station 2 is moving (consider e.g. an emergency case due to bush fire, where the car passengers try to escape, after having manually triggered an eCall). The advantage of this method is that neither MSC 6 nor SMS-SC 5 needs to be configured in a specific manner.

Case 3: Trigger Message $12_b$ and Instruction Message $12_a$ Both as a Normal SMS with Proprietary SMS SC (PSAP-SC) 4b

Figure 20:
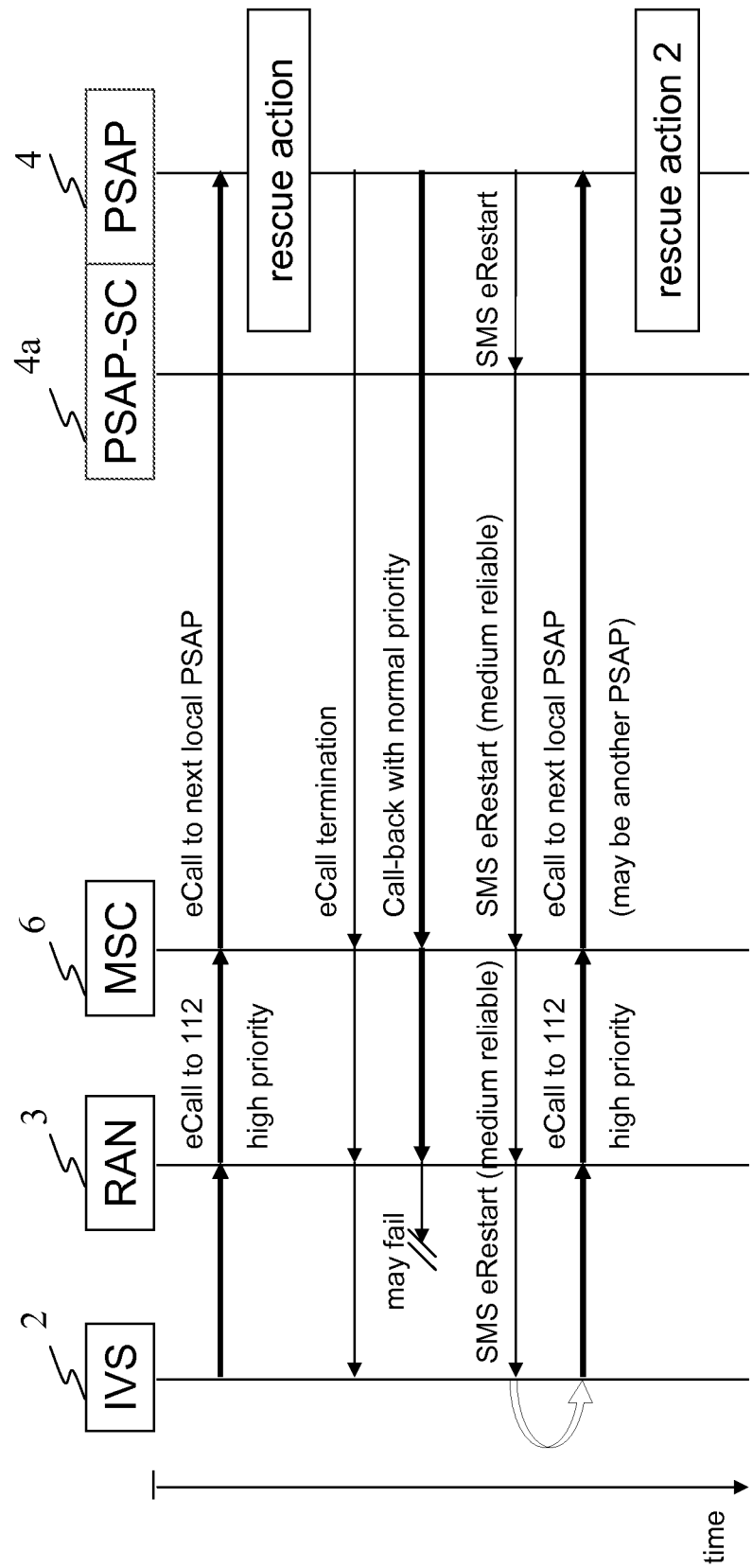
FIG. 20 is a diagram schematically illustrating a method in one embodiment of the invention, wherein SMS messages are exchanged between a PSAP, a PSAP SMS service centre (PSAP-SC) and a MSC during the process of re-establishing an emergency communication with the mobile station.

FIG. 20 is a diagram schematically illustrating a method in one embodiment of the invention, also for participating in re-establishing an emergency communication with a mobile station.

SMS messages $12_b$, $12_a$ are exchanged between a PSAP 4, a PSAP-SC 4b and a MSC 6. In other words, a proprietary SMS service center (PSAP-SC) 4b is deployed on the PSAP side, both for receiving SMS and sending of SMS. The SMS sent to the IVS 2 is reaching mobile station 2, as in case 2, regardless to which MSC 6 the mobile station 2 is registered. PSAP-SC 4b may be configured to repeat the attempts to send the messages, if necessary.

Regarding reliability, case 3 lies somewhere in the middle between case 1 and case 2, but the SMS reaches the IVS 2 also when IVS 2 is registered meanwhile to another MSC.

Case 4: Trigger Message $12_b$ and Instruction Message $12_a$ Both as a Normal SMS with Proprietary TPS-SC 4a

Figure 19:
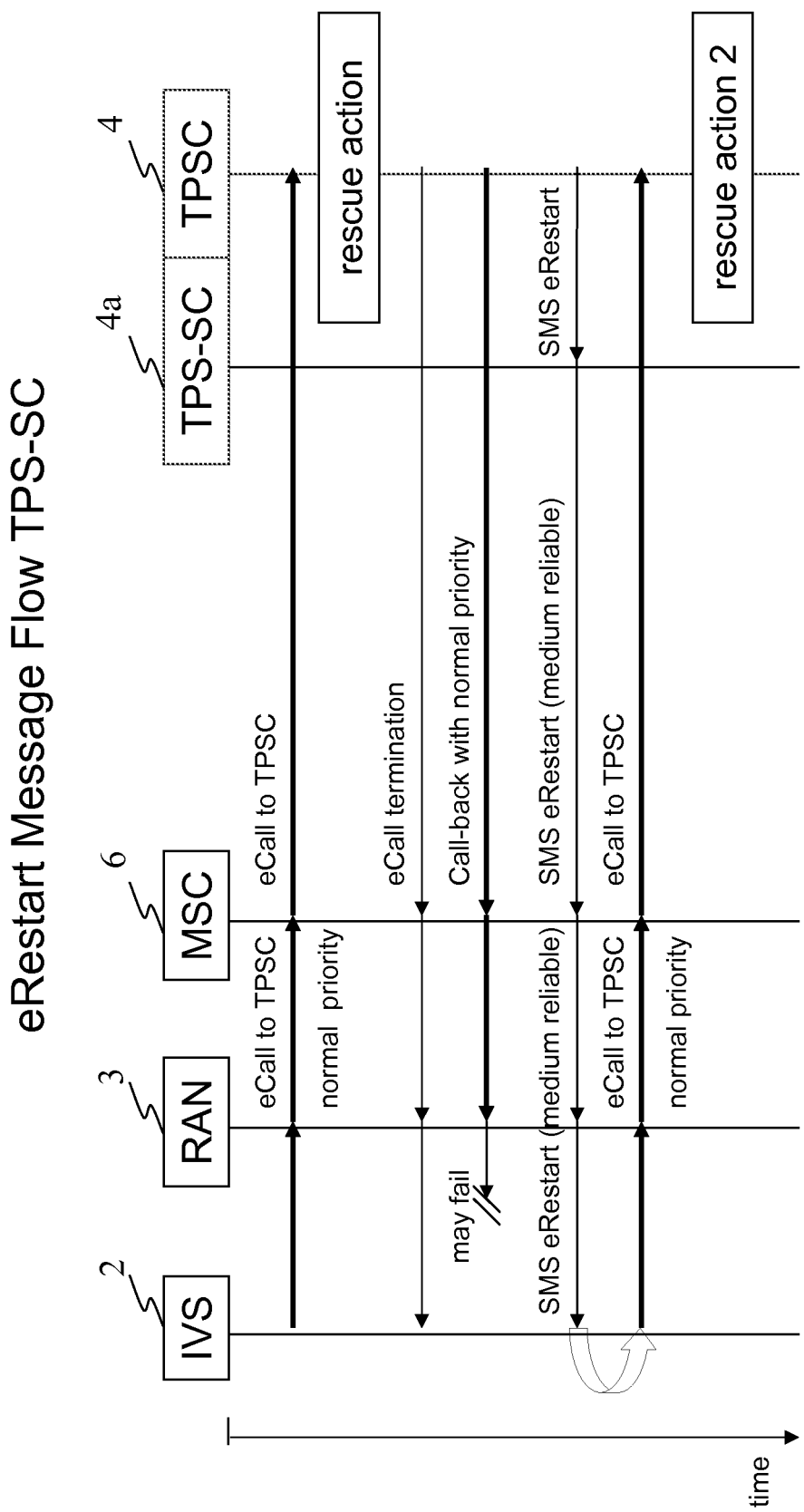
FIG. 19 is a diagram schematically illustrating a method in one embodiment of the invention, wherein SMS messages are exchanged between a TPSC, a third party SMS service centre (TPS-SC), and a MSC during the process of re-establishing an emergency communication with the mobile station.

A TPSC may also deploy its own TPS-SC 4a with the same features, as illustrated in FIG. 19. Namely, FIG. 19 is a diagram schematically illustrating a method in one embodiment of the invention, wherein SMS messages are exchanged between a TPSC 4, a third party SMS service center (TPS-SC)

4a, and a MSC 6 during the process of re-establishing an emergency communication with IVS 2.

In some embodiments of the invention, more than one of the above-mentioned cases 1, 2, 3 and 4 may be combined. Namely, in one embodiment, first the combination of SIP+SMS is tried (case 1), and then, if this attempt fails, a conventional SMS is used directly without SIP message (case 2). This embodiment combines the advantages of both cases 1 and 2.

Let us now return to the flowchart of FIG. 17, which provides a schematic overview of what happens at enhanced Restart of an eCall setup with eSMS, to provide some more detailed explanations. FIG. 17 shows a PSAP 4, a modified MSC 6, a RAN 3 and an IVS 2. The time axis in this drawing is running top to bottom.

When an accident happens (or the SOS-button is pressed), IVS 2 first of all tries to establish an emergency voice call to the next local PSAP 4. IVS 2 does not know which PSAP 4 is responsible for the area, where it is currently roaming. Thus, IVS 2 indicates "Emergency Call to 112" to the mobile network (or, for instance, "Emergency Call to 911" in the U.S., etc). The serving MSC 6 translates this by table-look-up (or other means) to the appropriate PSAP number. MSC 6 further takes care that the call is treated as a high priority call by the mobile radio network, i.e. if necessary another normal voice call may be terminated by the radio network to give room for the new emergency call.

The addressed PSAP equipment 4 gets the emergency call from MSC 6 and diverts the call to the free work stations of the human operators inside the PSAP 4. If none of the available work stations are free (i.e. the PSAP 4 is fully loaded), the call may be put into a waiting loop or may be forwarded to another PSAP 4. IVS 2 and MSC 6 have generally no insight into these actions.

Once a free work station is found, the bell is ringing at the PSAP side (alerting phase). The work station and the human operator then see and know the MSISDN of the IVS 2. They could use this MSISDN for a subsequent call-back or, in some embodiments of the invention, to send an eRestart-SMS to the IVS 2.

The call-back problem can be understood as follows. After the emergency call (eCall) is handled, the rescue action may be performed and the emergency call is terminated by the PSAP 4 (or often by the IVS 2 too early). In some cases, it is necessary for PSAP 4 to contact IVS 2 again for additional clarification. Setting up a call-back to IVS 2 may be tried, but often fails, or, if it succeeds, is subject to early termination in case another emergency call (eCall) is coming in.

In some embodiments of the invention, PSAP 4 therefore sends an instruction message $12_a$, such as an eRestart-SMS, to IVS 2 to re-trigger an additional emergency call. The IVS shall immediately perform this new emergency call, when it gets the eRestart-SMS. Alternatively, IVS 2 may ask the IVS-occupants for permission, before the new emergency call is established.

Since there is no voice call ongoing at the moment of sending the instruction message $12_a$, such as the eRestart-SMS, the instruction message $12_a$, such as an SMS, is sent in a usual manner from MSC 6 to IVS 2. This may take some seconds in GERAN and UTRAN. MSC 6 handles this eSMS with high priority and with a high number or retransmission attempts, if necessary. There could be several reasons why instruction message $12_a$, such as eRestart-SMS, is not immediately delivered and consequently several options to resolve the problem:

a) IVS 2 is not longer operational (battery is empty) or IVS 2 is no longer registered in the network (more than 12 hours have passed). In these cases, a call-back may be impossible.

b) Instruction message $12_a$, such as the eSMS, is lost on the radio channel. Then, MSC 6 may repeat the process of sending instruction message $12_a$, such as eSMS, as often as necessary (up to a maximum number of retries). This maximizes the success likelihood even in extreme overloaded situations. This is far better than with normal SMS delivery.

c) IVS 2 has moved out of the area of the first MSC 6 and IVS 2 is therefore no longer accessible for this MSC 6. IVS 2 is still registered to the network, but served now by another MSC 6. In that case, answering point 4, such the PSAP, may try to send the eRestart SIP message (trigger message $12_b$) to MSC 6 and, from there, via eSMS (instruction message $12_a$) to IVS 2. Since the number of MSCs 6 may be low in one network, this additional effort is negligible, both in time and messages.

d) IVS 2 has moved out of the area of the first MSC 6 and IVS 2 is therefore no longer accessible for this MSC 6. IVS 2 is still registered to the network, but served now by another, unmodified MSC. In that case, answering point 4, such the PSAP, may try to send the eRestart-SMS the normal way via the SMS service center. This is not very reliable and may fail often on radio or in the SMS service center. PSAP 4 may try to repeat the eRestart-SMS in cases of no feedback or in cases of negative feedback.

Alternatively, if a PSAP-SC 4b (or a TPS-SC 4a) is deployed (see FIGS. 20 and 19), then PSAP-SC 4b gets immediate feedback whether or not the SMS has been successfully delivered to IVS 2. In case of failure, PSAP-SC 4b may repeat the process of sending the SMS as often as needed. This is far better than the normal SMS delivery.

In a further embodiment, the serving MSC 6 which handled the first, initial emergency communication from mobile station 2 (such as IVS 2) to answering point 4 (such as PSAP 4) remembers both the mobile phone number, i.e. the IVS Number (MSISDN), and the SMS service center (SMSC) to which the eSMS was sent to, when it was sent on the fast way, i.e. via FACCH. When the eRestart-SMS (i.e., the message sent towards IVS 2 to re-establish the emergency communication) arrives in this serving MSC 6, MSC 6 may then prioritize this SMS down to the IVS 2 for all cases, i.e. (i) when the SIP-Messaging is used, (ii) when a normal SMSC is used, and (ii) when a proprietary SMSC is used. In all these cases, the eRestart-SMS should reach the IVS 2 with the highest likelihood (under given radio conditions). In an alternative embodiment, a HLR or VLR, rather than the MSC 6, remembers both the mobile phone number and the SMS service center (SMSC) to which the eSMS was sent to, when it was sent on the fast way, i.e. via FACCH.

The advantages of some embodiments of the invention are to optimize the success rate of emergency call-back calls without complex new signalling standards and deployments in wire line networks. Instead, existing building blocks are used and the modifications do not need new standards and can be implemented locally. Furthermore, it is feasible to deploy embodiments of the invention in a wide variety of architectures, reaching from existing Third Party eCall Services with traditional networks and traditional SMS to the most sophisticated approach using eSMS/SIP.

There is a small remaining risk that this eRestart-SMS from PSAP 4 to IVS 2 is not delivered due to an existing overload in the network. It must, however, be noted that the success rate of SMS is in general significantly higher than the success rate of a normal voice call. In addition, this "eRestart"-SMS may be repeated several times, if not successful, so that the chances are maximized.

If the eRestart-SMS is successful, the resulting eCall from mobile station 2 gets high priority and will be stable as long as necessary. In contrast, a normal call back, even if successful, would permanently be subject to early termination to give room for another emergency call (eCall). The inventors have noticed this existing risk of an early termination of a normal call back, although, as already mentioned, this lower success rate is in normal circumstances not noticed, because the networks are rarely overloaded. But in cases of bigger local or regional catastrophes, the effect may become cumbersome.

The invention may be applied using normal SMS technology. Just the format and contents of the SMS must be agreed upon by the PSAP 4 and IVS 2. In the context of eSMS, where the communication between PSAP 4 and MSC 6 is based on a highly reliable IP communication, the eSMS from PSAP 4 to IVS 2 is even far more reliable than a normal SMS and hence the invention may provide a highly reliable method to establish a follow-up eCall on the PSAP's request.

The method is also applicable to TPSCs, even though today emergency calls to TPSCs do not get the same high priority on the radio networks as the emergency call (eCall) to number "112" (or number "911" in the U.S., etc.). This is, however, only a matter of specification and implementation in the MSCs 6 and this may be easily adapted in the future. Today, a TPSC may setup the call-back to IVS 2 directly with the same effect (same priority and success rate). However, the TPSC may send an eRestart command to the IVS with the additional information to establish a high-priority eCall to the next local PSAP (instead of a normal-priority voice call to the TPSC).

The physical entities according to the invention or according to embodiments thereof, including mobile station 2, MSC 6 and answering point 4, may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "instruction message receiver", "new emergency communication starter", "instruction message transmission triggerer", etc. are used herewith, no restriction is made regarding how distributed these elements may be and regarding how gathered elements may be. That is, the constituent elements of a mobile station 2, MSC 6 or answering point 4 may be distributed in different software or hardware components or devices for bringing about the intended function. A plurality of distinct elements may also be gathered for providing the intended functionalities.

Any one of the above-referred elements of mobile station 2, MSC 6 and answering point 4, may be implemented in hardware, software, field-programmable gate array (FPGA), application-specific integrated circuit (ASICs), firmware or the like.

In further embodiments of the invention, any one of the above-mentioned and/or claimed instruction message receiver, new emergency communication starter, instruction message transmission triggerer, trigger message receiver, instruction message sender, determiner, instruction message re-sender, etc. is replaced by, respectively, an instruction message receiving unit, a new emergency communication starting unit, an instruction message transmission triggering unit, a trigger message receiving unit, an instruction message sending unit, a determining unit, an instruction message re-sending unit, etc. or by, respectively, instruction message receiving means, new emergency communication starting means, instruction message transmission triggering means, trigger message receiving means, instruction message sending means, determining means, instruction message re-sending means, etc, for performing the functions of, respectively, the instruction message receiver, new emergency communication starter, instruction message transmission triggerer, trigger message receiver, instruction message sender, determiner, instruction message re-sender, etc.

In further embodiments of the invention, any one of the above-described procedures or steps may be implemented using computer-readable instructions, for example in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method, carried out by a mobile station, for participating in re-establishing an emergency communication between an answering point in a network node, and the mobile station, the method comprising:
   receiving an instruction message, said instruction message including an instruction to start, from the mobile station, a new emergency call towards the answering point; and
   starting, from the mobile station, the new emergency call towards the answering point, wherein starting the new emergency call comprises autonomously starting the new emergency call towards the answering point without requiring the person who initially established the emergency communication to take any action.

2. The method of claim 1, wherein the instruction message comprises any one of a short message service message, an Unstructured Supplementary Service Data message, a Session Initiation Protocol message, and an IP Multimedia Subsystem message.

3. The method of claim 1, wherein the answering point comprises any one of a public safety answering point and a third-party service center.

4. The method of claim 1, wherein the mobile station comprises an in-vehicle system.

5. A method, carried out by an answering point in a network node, for participating in re-establishing an emergency communication between the answering point and a mobile station, the method comprising:
   triggering a transmission, towards the mobile station, of an instruction message, the instruction message including an instruction to start, from the mobile station, a new emergency call towards the answering point without requiring the person who initially established the emergency communication to take any action; and
   sending, towards the mobile station, a trigger message associated with the instruction message.

6. The method of claim 5, wherein the trigger message comprises any one of a short message service message, an Unstructured Supplementary Service Data message, a Session Initiation Protocol message, and an IP Multimedia Subsystem message.

7. The method of claim 5, wherein the instruction message comprises any one of a short message service message, an Unstructured Supplementary Service Data message, a Session Initiation Protocol message, and an IP Multimedia Subsystem message.

8. The method of claim 5, wherein the trigger message comprises the instruction message including the instruction to start the new emergency call towards the answering point.

9. A method, carried out by an intermediate network node between an answering point in a network node and a mobile station, for participating in re-establishing an emergency communication between the answering point and the mobile station, the method comprising:
  receiving, by the intermediate network node, a trigger message from the answering point; and
  sending, by the intermediate network node towards the mobile station, an instruction message including an instruction to start, from the mobile station, a new emergency call towards the answering point responsive to the trigger message without requiring the person who initially established the emergency communication to take any action.

10. The method of claim 9, further comprising:
  determining, by the intermediate network node, whether the instruction message has reached the mobile station based on whether the intermediate node receives feedback information or negative feedback information; and
  re-sending, by the intermediate network node, the instruction message towards the mobile station.

11. The method of claim 10, further comprising repeating the determining and re-sending steps as long as the instruction message has not reached the mobile station, a number of times greater than the number of times that the intermediate network node attempts to re-send messages that are not used for re-establishing the emergency call between the answering point and a mobile station.

12. The method of claim 10, further comprising repeating the determining and re-sending steps as long as the instruction message has not reached the mobile station, up to n times, wherein n comprises an integer, and wherein at least one of the following applies: n≥2, n≥5, n≥20, and n≥50.

13. A mobile station configured to participate in re-establishing an emergency communication between an answering point in a network node, and the mobile station, the mobile station comprising:
  an instruction message receiver configured to receive an instruction message said instruction message including an instruction to start, from the mobile station, a new emergency call towards the answering point; and
  a new emergency communication starter unit, configured to start, from the mobile station, the new emergency call towards the answering point, wherein the new emergency communication starter unit is configured to autonomously start the new emergency call towards the answering point without requiring the person who initially established the emergency communication to take any action.

14. The mobile station of claim 13, wherein the instruction message comprises any one of a short message service message, an Unstructured Supplementary Service Data message, a Session Initiation Protocol message, and an IP Multimedia Subsystem message.

15. The mobile station of claim 13, wherein the answering point comprises any one of a public safety answering point and a third-party service center.

16. The mobile station of claim 13, wherein the mobile station comprises an in-vehicle system.

17. An answering point in a network node, said answering point configured to participate in re-establishing an emergency communication between the answering point and a mobile station, the answering point comprising:
  a instruction message transmission triggerer unit configured to trigger a transmission, towards the mobile station, of an instruction message, said instruction message including an instruction to start, from the mobile station, a new emergency call towards the answering point without requiring the person who initially established the emergency communication to take any action; and
  wherein the instruction message transmission triggerer unit is further configured to send, towards the mobile station, a trigger message associated with the instruction message.

18. The answering point of claim 17, wherein the trigger message comprises any one of a short message service message, an Unstructured Supplementary Service Data message, a Session Initiation Protocol message, and an IP Multimedia Subsystem message.

19. The answering point of claim 17, wherein the instruction message comprises any one of a short message service message, an Unstructured Supplementary Service Data message, a Session Initiation Protocol message, and an IP Multimedia Subsystem message.

20. The answering point of claim 17, wherein the trigger message comprises the instruction message including the instruction to start the new emergency call towards the answering point.

21. An intermediate network node between a mobile station and an answering point in a network node, said intermediate network node configured to participate in re-establishing an emergency communication between the answering point and the mobile station, said intermediate network node comprising:
  a trigger message receiver configured to receive a trigger message from the answering point; and
  a instruction message sender configured to send, towards the mobile station, an instruction message including the instruction to start, from the mobile station, a new emergency call towards the answering point based on the trigger message without requiring the person who initially established the emergency communication to take any action.

22. The intermediate network node of claim 21, wherein the intermediate network node further comprises:
  a determiner unit configured to determine whether the instruction message has reached the mobile station based on whether the intermediate unit receives feedback information or negative feedback information; and
  an instruction message re-sender unit configured to re-send the instruction message towards the mobile station responsive to the determiner unit determining the instruction message has not reached the mobile station.

23. The intermediate network node of claim 22, wherein the determiner unit and the instruction message re-sender unit are configured to repeat, as long as the instruction message has not reached the mobile station, the operations of:
  determining that the instruction message has not reached the mobile station, and
  re-sending the instruction message towards the mobile station a number of times greater than the number of times that the intermediate network node is configured to attempt to re-send messages that are not used for re-establishing the emergency call between the answering point and a mobile station.

24. The intermediate network node of claim 22, wherein the determiner unit and the instruction message re-sender unit are configured to repeat, as long as the instruction message has not reached the mobile station, the operations of:
- determining that the instruction message has not reached the mobile station, and
- re-sending the instruction message towards the mobile station up to n times, wherein n comprises an integer and at least one of the following applies: n≥2, n≥5, n≥20, and n≥50.

25. A computer program including non-transient computer-readable instructions configured, when executed on a mobile station, to participate in re-establishing an emergency communication between an answering point in a network node and the mobile station, said computer-readable instructions configured to:
- receive an instruction message, said instruction message including an instruction to start, from the mobile station, a new emergency call towards the answering point; and
- start, from the mobile station, the new emergency call towards the answering point, wherein the computer readable instructions are configured to autonomously start the new emergency call towards the answering point without requiring the person who initially established the emergency communication to take any action.

26. A computer program including non-transient computer-readable instructions configured, when executed on an answering point in a network node, to participate in re-establishing an emergency communication between the answering point and a mobile station, the computer-readable instructions configured to:
- trigger a transmission, towards the mobile station, of an instruction message, the instruction message including an instruction to start, from the mobile station, a new emergency call towards the answering point without requiring the person who initially established the emergency communication to take any action; and
- send, towards the mobile station, a trigger message associated with the instruction message.

* * * * *

UNITED STATES PATENT AND TRADEMARK OFFICE
CERTIFICATE OF CORRECTION

PATENT NO. : 8,913,979 B2  
APPLICATION NO. : 13/143397  
DATED : December 16, 2014  
INVENTOR(S) : Hellwig et al.

Page 1 of 1

It is certified that error appears in the above-identified patent and that said Letters Patent is hereby corrected as shown below:

On the Title Page, item (22), under "PCT FILED", in Column 1, Line 13, delete "May 25, 2012" and insert -- JUNE 15, 2011 --, therefor.

On the Title Page, item (86), under "PCT No.:", in Column 1, Line 14, delete "PCT/EP2012/059919" and insert -- PCT/EP2011/059919 --, therefor.

In the specification

In Column 11, Line 24, delete "n 2, n 5, n 20, and n 50." and insert -- $n \geq 2$, $n \geq 5$, $n \geq 20$, and $n \geq 50$. --, therefor.

In Column 18, Line 24, delete "Message $12_a$" and insert -- Message $12_a$, --, therefor.

In Column 18, Line 43, delete "Message $12_a$" and insert -- Message $12_a$, --, therefor.

In Column 18, Line 61, delete "Message $12_a$" and insert -- Message $12_a$, --, therefor.

Signed and Sealed this  
Tenth Day of November, 2015

Michelle K. Lee  
*Director of the United States Patent and Trademark Office*